(12) United States Patent
Ritter et al.

(10) Patent No.: US 11,936,955 B2
(45) Date of Patent: *Mar. 19, 2024

(54) ATTRACTING USER ATTENTION TO ADVERTISEMENTS

(71) Applicant: uSeek, Inc., Whitefish, MT (US)

(72) Inventors: Huntley Stafford Ritter, Kalispell, MT (US); Matthew Ambert Hartle, Kalispell, MT (US)

(73) Assignee: uSeek, Inc., Whitefish, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/885,203

(22) Filed: Aug. 10, 2022

(65) Prior Publication Data

US 2022/0385978 A1 Dec. 1, 2022

Related U.S. Application Data

(63) Continuation of application No. 16/564,189, filed on Sep. 9, 2019, now Pat. No. 11,451,873, which is a
(Continued)

(51) Int. Cl.
*H04N 21/4784* (2011.01)
*G06Q 30/02* (2023.01)
*G06Q 30/0241* (2023.01)
*G06Q 30/0251* (2023.01)
*G06Q 50/00* (2012.01)
(Continued)

(52) U.S. Cl.
CPC ..... *H04N 21/4784* (2013.01); *G06Q 30/0269* (2013.01); *G06Q 30/0277* (2013.01); *G06Q 30/0278* (2013.01); *G06Q 50/01* (2013.01); *H04N 21/25866* (2013.01); *H04N 21/44226* (2020.08); *H04N 21/47205* (2013.01); *H04N 21/812* (2013.01); *H04N 21/8583* (2013.01); *H04L 67/01* (2022.05)

(58) Field of Classification Search
CPC ......... H04N 21/4784; H04N 21/25866; H04N 21/44226; H04N 21/47205; H04N 21/812; H04N 21/8583; G06Q 30/0269; G06Q 30/0277; G06Q 30/0278; G06Q 50/01; H04L 67/01; H04L 67/535
See application file for complete search history.

(56) References Cited

U.S. PATENT DOCUMENTS 6,102,406 A * 8/2000 Miles .................. A63F 9/183
434/350
6,240,555 B1 * 5/2001 Shoff .................. H04N 21/4314
725/111
(Continued)

*Primary Examiner* — Nathan J Flynn
*Assistant Examiner* — Christine A Kurien
(74) *Attorney, Agent, or Firm* — Blank Rome LLP

(57) ABSTRACT

One or more videos are presented to a user. The videos include a plurality of hidden artifacts. The videos also include advertisements. The user looks for the hidden artifacts in the videos. Whenever the user finds the hidden artifacts in one of the videos, the user selects locations in the videos that correspond to the hidden artifacts. A computing device performs different actions depending on which ones of the hidden artifacts the user is able to find. For example, the computing device can provide different rewards to the user depending on which ones of the hidden artifacts the user is able to find.

10 Claims, 15 Drawing Sheets

Related U.S. Application Data continuation of application No. 15/397,434, filed on Jan. 3, 2017, now abandoned, which is a continuation of application No. 13/116,896, filed on May 26, 2011, now abandoned, and a continuation-in-part of application No. 12/829,113, filed on Jul. 1, 2010, now abandoned.

(60) Provisional application No. 61/222,579, filed on Jul. 2, 2009.

(51) Int. Cl.
*H04N 21/258* (2011.01)
*H04N 21/442* (2011.01)
*H04N 21/472* (2011.01)
*H04N 21/81* (2011.01)
*H04N 21/858* (2011.01)
*H04L 67/01* (2022.01)

(56) References Cited

U.S. PATENT DOCUMENTS

| | | | | |
|---|---|---|---|---|
| 6,335,744 B1* | 1/2002 | Korilis | ............... | G06Q 30/02 715/835 |
| 6,415,438 B1* | 7/2002 | Blackketter | ........ | H04N 21/2665 348/E7.071 |
| 6,766,524 B1* | 7/2004 | Matheny | ............ | G06Q 30/0241 725/23 |
| 7,000,242 B1* | 2/2006 | Haber | ................ | G06Q 40/12 725/43 |
| 7,086,075 B2* | 8/2006 | Swix | ................ | H04H 20/28 725/12 |
| 7,577,978 B1* | 8/2009 | Wistendahl | ........... | A63F 13/426 725/111 |
| 7,900,225 B2* | 3/2011 | Lyon | ................ | H04N 21/812 725/111 |
| 2002/0124249 A1* | 9/2002 | Shintani | ............ | H04N 21/4331 348/E7.075 |
| 2003/0004808 A1* | 1/2003 | Elhaoussine | ....... | G06Q 20/3224 705/14.27 |
| 2005/0203801 A1* | 9/2005 | Morgenstern | ...... | G06Q 30/0249 705/14.55 |
| 2007/0107021 A1* | 5/2007 | Angel | .............. | H04N 21/812 348/E7.071 |
| 2007/0192784 A1* | 8/2007 | Postrel | ............... | H04N 21/4316 725/23 |
| 2007/0226062 A1* | 9/2007 | Hughes | ............. | G06Q 30/0212 463/9 |
| 2007/0260987 A1* | 11/2007 | Mohoney | ............. | G11B 27/105 |
| 2008/0033801 A1* | 2/2008 | McKenna | .......... | H04N 21/2665 705/14.4 |
| 2008/0225060 A1* | 9/2008 | Thelen | .................... | A63F 13/80 345/676 |
| 2009/0007186 A1* | 1/2009 | Hartwell | ................. | A63F 13/35 725/62 |
| 2009/0062007 A1* | 3/2009 | Chihaya | .................. | A63F 13/69 463/42 |
| 2009/0138904 A1* | 5/2009 | Kitsukawa | ............. | G06Q 30/02 725/23 |
| 2009/0171787 A1* | 7/2009 | Mei | ..................... | G06Q 30/0273 705/14.69 |
| 2009/0300670 A1* | 12/2009 | Barish | .................. | H04N 7/17318 725/23 |
| 2013/0205326 A1* | 8/2013 | Sinha | ............... | H04N 21/44008 725/23 |
| 2015/0355826 A1* | 12/2015 | Gibbons | ................. | A63F 13/00 715/720 |

* cited by examiner

ATTRACTING USER ATTENTION TO ADVERTISEMENTS

CROSS-REFERENCE TO RELATED APPLICATIONS

This application is a continuation application of U.S. patent application Ser. No. 16/564,189, filed on Sep. 9, 2019, which is a continuation of U.S. patent application Ser. No. 15/397,434, filed on Jan. 3, 2017, now abandoned, which is a continuation of U.S. patent application Ser. No. 13/116,896, filed on May 26, 2011, now abandoned, which is a continuation-in-part of U.S. patent application Ser. No. 12/829,113, filed on Jul. 1, 2010, now abandoned, which claims the benefit of U.S. Provisional Application No. 61/222,579, filed on Jul. 2, 2009. The entire contents of those applications are incorporated herein by reference.

BACKGROUND

Product placement is a technique where branded goods or services are advertised in a context usually devoid of advertisements. For example, branded goods or services may be advertised in movies and television shows. A goal of such product placement is to make the users feel like the advertised products or services are used by characters or at least are pervasive parts of the environment inhabited by the characters.

Frequently, advertisements are placed in unobtrusive parts of movies and television shows so as not to distract users from the primary action of the movies or television shows. For instance, a billboard advertising a brand of soft drinks may appear in the background of an outdoor scene of a movie. However, because the advertisements are placed in unobtrusive parts of movies and television shows, users frequently overlook the advertisements.

SUMMARY

A computing device presents videos to a user. The videos include a plurality of hidden artifacts. The videos also include advertisements. The user looks for the hidden artifacts in the videos. When the user finds a hidden artifact in one of the videos, the user selects a location in the video that corresponds to the hidden artifact. By looking for the hidden artifacts, the user is more likely to notice the advertisements. The computing device can perform different actions to reward the user based on which ones of the hidden artifacts the user is able to find.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

As briefly described above, a distribution entity distributes media containing at least one embedded advertisement and a hidden artifact designed to draw a user's attention to the advertisement. The techniques of this disclosure are described with reference to the attached figures. It should be appreciated that the attached figures are provided for purposes of explanation only and should not be understood as representing a sole way of implementing the techniques of this disclosure. In the attached figures, stacked blocks represent one or more similar, but not necessarily identical, items. In addition, ellipses between items represent one or more similar, by not necessarily identical, items. Items having similar references numbers of having alphabetical suffixes (e.g., "A" through "N") are not intended to indicate the existence of a specific number of items.

Figure 1:
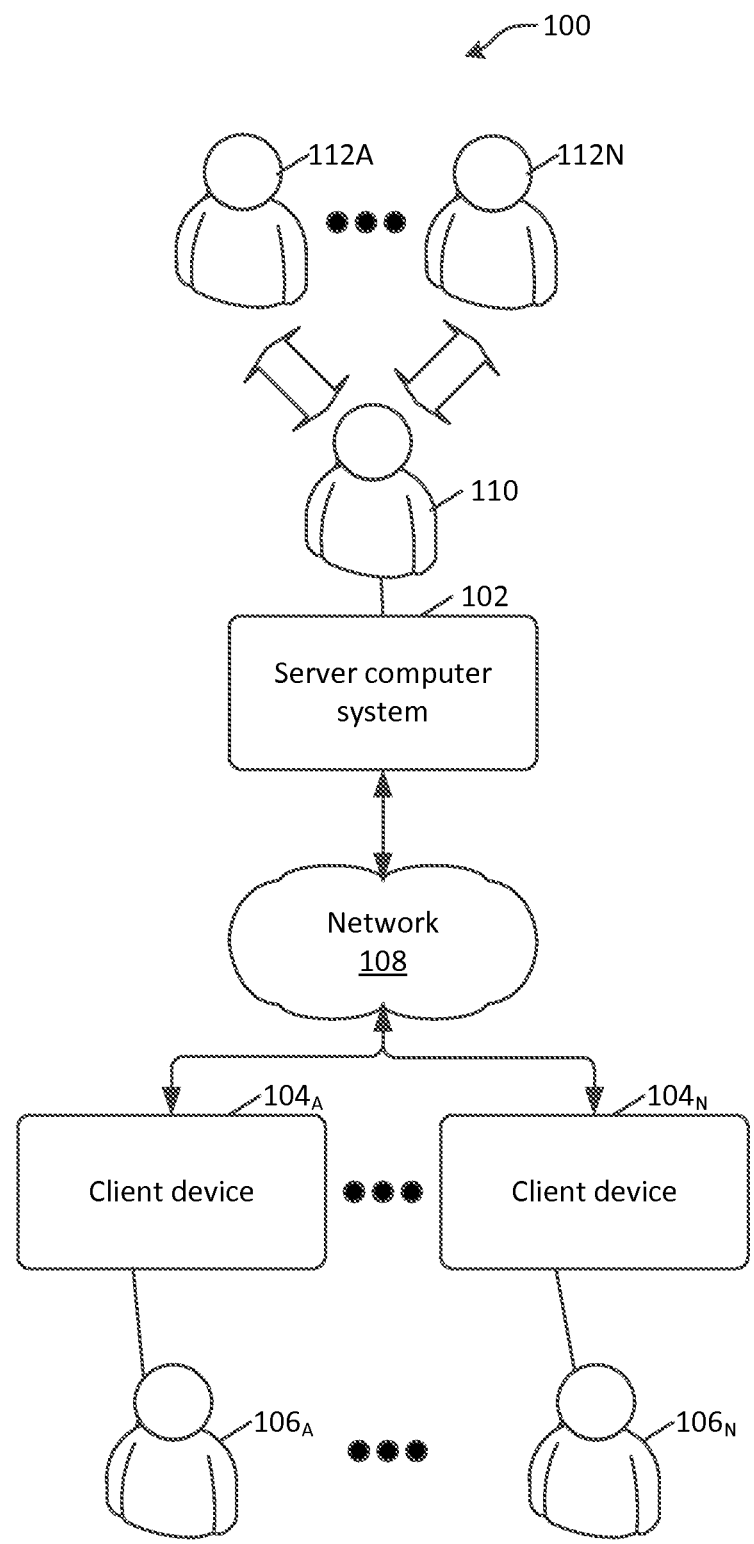
FIG. 1 illustrates an example media distribution system.

FIG. 1 illustrates an example media distribution system 100 that distributes media content. It should be appreciated that the media distribution system 100 is merely an example and that there may be many other possible media distribution systems that distribute the media. As illustrated in the example of FIG. 1, the media distribution system 100 comprises a server computing system 102, client devices 104A through 104N (collectively, "client devices 104"), users 106A through 106N (collectively, "users 106"), a network 108, a distribution entity 110, and advertisers 112A through 112N (collectively, "advertisers 112").

The server computing system 102 and the client device 104 are electronic computing systems. Electronic computing systems comprise one or more physical electronic computing devices. For instance, the server computing system 102 may comprise twenty separate physical electronic computing devices. Electronic computing devices include physical machines having physical electronic components. Electronic components are physical entities that affect electrons or fields of electrons in a desired manner consistent with the intended function of an electronic computing device. Example types of electronic components include capacitors, resistors, diodes, transistors, and other types of physical entities that affect electrons or fields of electrons in a manner consistent with the intended function of an electronic computing device. An example physical computing device is described below with reference to FIG. 10.

The server computing system 102 is operated by or on behalf of the distribution entity 110. In some embodiments, the distribution entity 110 is a natural entity. In other embodiments, the distribution entity 110 is a legal entity. Example types of entities include corporations, partnerships, proprietorships, companies, non-profit corporations, foundations, estates, governmental agencies, and other types of legal entities.

In different embodiments, the server computing system 102 is operated by or on behalf of different types of entities. In some implementations, the server computing system 102 is operated by a web services provider on behalf of the distribution entity 110. In such implementations, the distribution entity 110 may not be aware of how the server computing system 102 is implemented. Consequently, services provided by the server computing system 102 may appear, from the perspective of the distribution entity 110, to be provided by "the cloud." In the terminology of cloud computing, "the cloud" refers to a network of physical electronic computing devices in which the individual physical electronic computing devices are abstracted away.

The client devices 104 comprise electronic computing systems that are able to play back media, such as a video. In different instances, the client devices 104 may be a wide variety of different types of electronic computing systems. For example, the client devices 104 can be personal computers, lap top computers, cellular telephones, smartphones, watches, tablet computers, video game consoles, netbooks, personal media players, devices integrated into vehicles, television set top boxes, network appliances, server devices, supercomputers, mainframe computers, or other types of electronic computing systems.

Playing back media can entail rendering of the media in a format that can be consumed by a user. In most examples provided herein, the media is video, although other types of media, such as games, can also be used. For example, if the media is video, the playback of the video entails rendering video data to produce the video. Furthermore, a video is a displayed sequence of frames in which frames are replaced in succession to create an illusion of motion. A frame is a still visible image. A user is a person viewing a video. Moreover, video data is data that, when appropriately rendered, produces a video.

The users 106 view videos played back by the client devices 104. The users 106 are individual human beings. It should be appreciated that in some instances, multiple users at the same time are able to view a video played back by the client devices 104.

The network 108 is an electronic communication network that facilitates communication between the server computing system 102 and the client devices 104. Electronic communication networks comprise networks of two or more electronic computing devices (e.g., server computing system 102 and the client devices 104) having one or more communication links, the electronic computing devices configured to use the communication links communicate electronic data.

The network 108 may be a wide variety of different types of electronic communication network. For example, the network 108 may be a wide-area network, such as the Internet, a local-area network, a metropolitan-area network, or another type of electronic communication network. The network 108 may include wired and/or wireless data links. A variety of communications protocols may be used in the network 108 including, but not limited to, Ethernet, Transport Control Protocol (TCP), Internet Protocol (IP), Hypertext Transfer Protocol (HTTP), SOAP, remote procedure call protocols, and/or other types of communications protocols. In some implementations, the server computing system 102 and the client devices 104 communicate via the network 108 securely. In a first example, the server computing system 102 and the client devices 104 use secure sockets layer (SSL) techniques to communicate securely over the network 108. In another example, the server computing system 102 and the client devices 104 use IPSec to communicate securely over the network 108.

In the example of FIG. 1, the client devices 104 receive video data from the server computing system 102 via the network 108. In different embodiments, the client devices 104 receive the video data from the server computing system 102 in different ways. In a first example, the client devices 104 can receive a video file containing the video data from the server computing system 102 via the network 108. A video file is a file containing video data. Furthermore, a file is a set of data that has a name and that persists when no computer process is using it. In another example, the client devices 104 receive video streams from the server computing system 102 via the network 108. The video streams contain the video data. In some instances, a video stream can be a succession of video data supplied over time.

It should be appreciated that in other media distribution systems, client devices do not necessarily receive video data from server computing systems via electronic communications networks. For example, in one example media distribution system, video data is stored on a computer-readable data storage medium. A computer-readable data storage medium is a device or article of manufacture that stores data that can be read by an electronic computing device. Example types of computer-readable data storage media include CD-ROMS, compact discs, digital versatile discs (DVDs), Blu-ray discs, solid-state memory devices, magnetic disks, read-only memory units, random access memory modules, and other types of devices or articles of manufacture that store data that can be read by an electronic computing device. In this example, a client device receives the video data when a user inserts a computer-readable data storage medium storing the video data into a reader device configured to read data from the computer-readable data storage medium. The reader device is integrated into or connected to the client device such that the client device receives data read by the reader device.

Furthermore, the reader will appreciate that in some embodiments, the client devices 104 receive the video data by dynamically generating the video data. In such implementations, the client devices 104 may dynamically generate the video data by executing software instructions. For example, the client devices 104 may store video game applications that, when executed by the client devices 104, present the video data. In this example, the video game applications may dynamically generate the video data.

When the client devices 104 receive the video data, the client devices 104 play back the video. The video comprises a sequence of frames. The sequence of frames comprises a first set of frames and a second set of frames. In some instances, the sequence of frames includes frames in addition to those in the first set of frames and the second set of frames. Furthermore, in some instances, the first set of frames and the second set of frames include the same frame.

Each frame in the first set of frames comprises a different region in a first set of visually corresponding regions. As used in this disclosure, a region of a frame is a bounded sub-section of the frame. In some instances, a region of a frame does not include the entire frame. Visually corresponding regions are bounded sub-sections of frames in a series of frames each containing digital images of the same object. For example, a series of frames in a video may include digital images of a billboard in the background of a scene. In this example, the regions of the frames containing the digital images of the billboard are visually corresponding regions. It should be appreciated that, in some instances, regions in a set of visually corresponding regions differ from frame to frame. For example, the image of the billboard may move around, become bigger or smaller, may change color, may be partially obscured by another object, and so on during the course of the series of frames. In this example, the regions differ from frame to frame such that the region of each frame includes the image of the billboard.

The region in the first set of visually corresponding regions contains an advertisement. Advertisements include artifacts designed to raise a user's awareness of a product offered by an entity. A product can be a good or a service. Example types of artifacts include digital images and animated sequences of digital images. For example, a company's logo can be an artifact designed to raise a user's awareness of a product offered by the company.

In some embodiments, the first set of visually corresponding regions in an original version of the video does not contain the advertisement or contains an undesired advertisement. However, after the original version of the video was produced, the first set of visually corresponding regions is modified such that the first set of visually corresponding regions contains the desired advertisement.

For example, assume that the video is a movie produced in the year 1996. In the background of a scene of the movie, there is a blank exterior wall of a building. In this example, the first set of visually corresponding regions contains the digital image of the wall. Furthermore, in this example, in the year 2009 the movie is set to be re-released on the Internet. In advance of the re-release of the movie, the distribution entity 110 modifies the image within the first set of corresponding regions such that instead of containing images of the blank wall, the first set of visually corresponding regions contains images of the wall, except with a company's logo painted on the wall. The distribution entity 110 can be responsible for re-releasing the movie and can receive compensation from one or more advertisers 112 to embed advertisements in this way. In some instances, the video may contain a plurality of such sets of visually corresponding regions containing advertisements.

In many instances, the advertisement is located in an unobtrusive location within the video. That is, the advertisement is located away from where users' attention is likely to be. As opposed to locating advertisements at locations where the users' attention is likely to be, locating advertisements at unobtrusive locations may make the video feel more natural and may improve the viewing experiences of the users 106. For example, the advertisement may be in the background. In another example, the advertisement may be in the foreground, but not a part of the foreground where the primary action is occurring. In a yet another example, the advertisement may be in a part of a scene that is not completely in focus.

Each frame in the second set of frames comprises a different region in a second set of visually corresponding regions. Each region in the second set of visually corresponding regions contains a hidden artifact. The hidden artifact is an artifact for which the users 106 are encouraged to look. The hidden artifact may be a wide variety of different types of artifact.

For example, the hidden artifact may be a digital image of a particular type of handbag. In another example, the hidden artifact may be a digital image of a particular type of telephone. In different instances, the hidden artifact may or may not be an advertisement. Furthermore, in different instances, the hidden artifact may or may not be in an original version of the video. For instance, in the movie example of the previous paragraph, the version of the movie produced in 1996 may or may not include the hidden artifact.

The users 106 are provided with messages that encourage the users 106 to look for the hidden artifact. In different instances, the messages are provided to the users 106 in different ways. For example, the video may contain frames that include a printed message encouraging the users 106 to look for the hidden artifact in the video. In this first example, the printed message may read "when you find a green coffee cup in this video, click on it to be entered in a drawing for a free prize!" In another example, the video may be accompanied by audio in which the users 106 are verbally encouraged to look for the hidden artifact in the video. In yet another example, a web page may include a printed message that encourages the users 106 to look for the hidden artifact in the video. In this example, the web page may be a page in which the video is embedded or another web page. Furthermore, in this example, the distribution entity 110 may embed the message into the web page as an advertisement or as part of the normal content of the web page. In yet another example, a physical medium (e.g., newspaper, magazine, billboard, brochures, handouts, product packaging for the video or another good, etc.) may contain a message encouraging the users 106 to look for the hidden artifact in the video. In yet another example, messages encouraging the users 106 to look for the hidden artifact in the video are transmitted to the users 106 via a broadcast medium (e.g., aerial television, satellite television, cable television, Internet television, aerial radio, satellite radio, Internet radio, etc.) or via another information distribution medium (e.g., instant messages, text messages, TWITTER®, e-mail messages, social networking sites, etc.). In yet another example, a person encourages the users 106 to look for the hidden artifact in the video. In this example, the person may be an actor in the video, a celebrity, or some other person.

Furthermore, in some embodiments, the message encourages the users 106 to look for the hidden artifact with the promise of a reward to the users 106 if the users 106 find the hidden artifact. In a first example, the messages encourage the users 106 to look for the hidden artifact with the promise that the users 106 will have a chance to win a prize if the users 106 find the hidden artifact. In this first example, the prize may be associated with the content of the video. For instance, if the video is an episode of a television show about fashionable New York women, the prize may be a pair of shoes from a luxury shoe designer. In a second example, the message encourages the users 106 to look for the hidden artifact with the promise that the users 106 will be shown special footage if the users 106 find the hidden artifact. In this second example, the special footage may be a deleted scene of a movie, a trailer for a highly anticipated upcoming movie, scenes from an upcoming episode of a television program, and so on. In a third example, the message encourages the users 106 to look for the hidden artifact with the promise that the users 106 will be able to access a secret level of a video game, unlock a special video game character, play a secret game, etc.

In some embodiments, there can be a varying number of prizes. For example, if the video is a full-length movie, there can be 6-10 prizes with associated hidden artifacts embedded in the movie. The menu or opening credits for the movie can explain the contest and identify the different hidden artifacts (e.g., icons) for which to look in the movie and the associated prizes for each. Some of the prizes may be small (e.g., a pair of sunglasses), while others can be large (e.g., cash prizes, cars, motorcycles, etc.). For the smaller prizes the user can select the artifact within the movie and provide contact information, such as name, age, and email address, so that the prize can be sent directly to the user. For larger prizes, the user may provide contact information so that the user can be entered into a contest (e.g., lottery, raffle) to win the larger prize. Other variations are possible.

In yet another embodiment, the user is given a code, such as a number, when the user finds the hidden artifact. The user can then use the number at a later point to play a game and/or win a prize. For example, the user can send a text to the number provided to receive information about accessing a game. The user can then play the game to win prizes.

During playback of the video, the hidden artifact is at least somewhat difficult for the users 106 to perceive except when the users 106 are paying attention to details of the video. For example, the hidden artifact may be small in size. In a second example, the hidden artifact may only be shown in the video for a short amount of time. In a third example, the hidden artifact may be in a part of a scene that is not where the users 106 would typically focus their attentions. For instance, in this third example, if two characters in a movie are fighting in the foreground while traveling down a highway at great speed, the attentions of the users 106 would likely be focused on the fighting action in the foreground. Consequently, in this third example, when the users 106 are not paying attention to details in the video it would be at least somewhat difficult for the users 106 to perceive the hidden artifact when the hidden artifact is on a truck in the background moving in the opposite direction.

In typical instances, the users 106 are not told where or when the hidden artifact appears in the video. Because the hidden artifact is at least somewhat difficult for users 106 to perceive except when the users 106 are paying attention to details of the video, the users 106 are more likely to pay close attention to details throughout the video. Because the users 106 are more likely to pay close attention to details throughout the video, the users 106 are more likely to notice the one or more advertisements unobtrusively inserted into the video. Having the users 106 notice an advertisement is a goal of an advertiser.

When the users 106 find a hidden artifact in a video while the client devices 104 are playing back the video, the users 106 are able to select the hidden artifact. In some embodiments, selecting the hidden artifact entails providing, by the users 106, selection input to the client devices 104. The selection input indicates a selection of a location within or reasonably close to a region in the second set of visually corresponding regions of the second set of frames. Because the hidden artifact may be quite small, selecting the hidden artifact itself may be relatively difficult while the video is being played back. Accordingly, in some implementations, if the selection input indicates a selection of a location relatively close to the hidden artifact (e.g., in the same quadrant of the second set of frames as the hidden artifact) the selection input is taken to indicate that one of the users 106 has selected a location corresponding to the hidden artifact.

In different instances, the client devices 104 receive the selection input in different ways. For example, the client devices 104 may receive the selection input via an input device. Example types of input devices include mice, trackballs, stylus input devices, keywords, video game control pads, joysticks, movement-sensitive controllers (e.g., Nintendo WII® remote controllers, etc.), gun type video game controllers, musical instrument type video game controllers, touch sensitive screens, television/home entertainment system remote controllers, and other types of input devices.

In response to receiving the selection input, the client devices 104 access a target resource. The client devices 104 do not access the target resource when the client devices 104 do not receive a selection input that indicates that the users 106 have selected the hidden artifact.

The target resource may be a wide variety of different types of resources. The target resource may be a game, software instructions that unlock a special video game character, video footage, software instructions that unlock a video game level, a web page that allows the users 106 to enter information to be entered in a drawing for a prize, and so on.

In different instances, the client devices 104 access the target resource in different ways. For instance, the client devices 104 may access the target resource in different ways depending on the type of the target resource. In a first example, the target resource is a web page. In this first example, the client devices 104 access the web page by transmitting a resource request to a server computing system that hosts the web page, receiving the web page in response to the resource request, and displaying the web page. Furthermore, in this first example, the server computing system that hosts the web page may or may not be the server computing system 102. In a second example, the target resource is a game. In this second example, the client devices 104 access the resource by executing software instructions that cause the client devices 104 to present the game.

Figure 2:
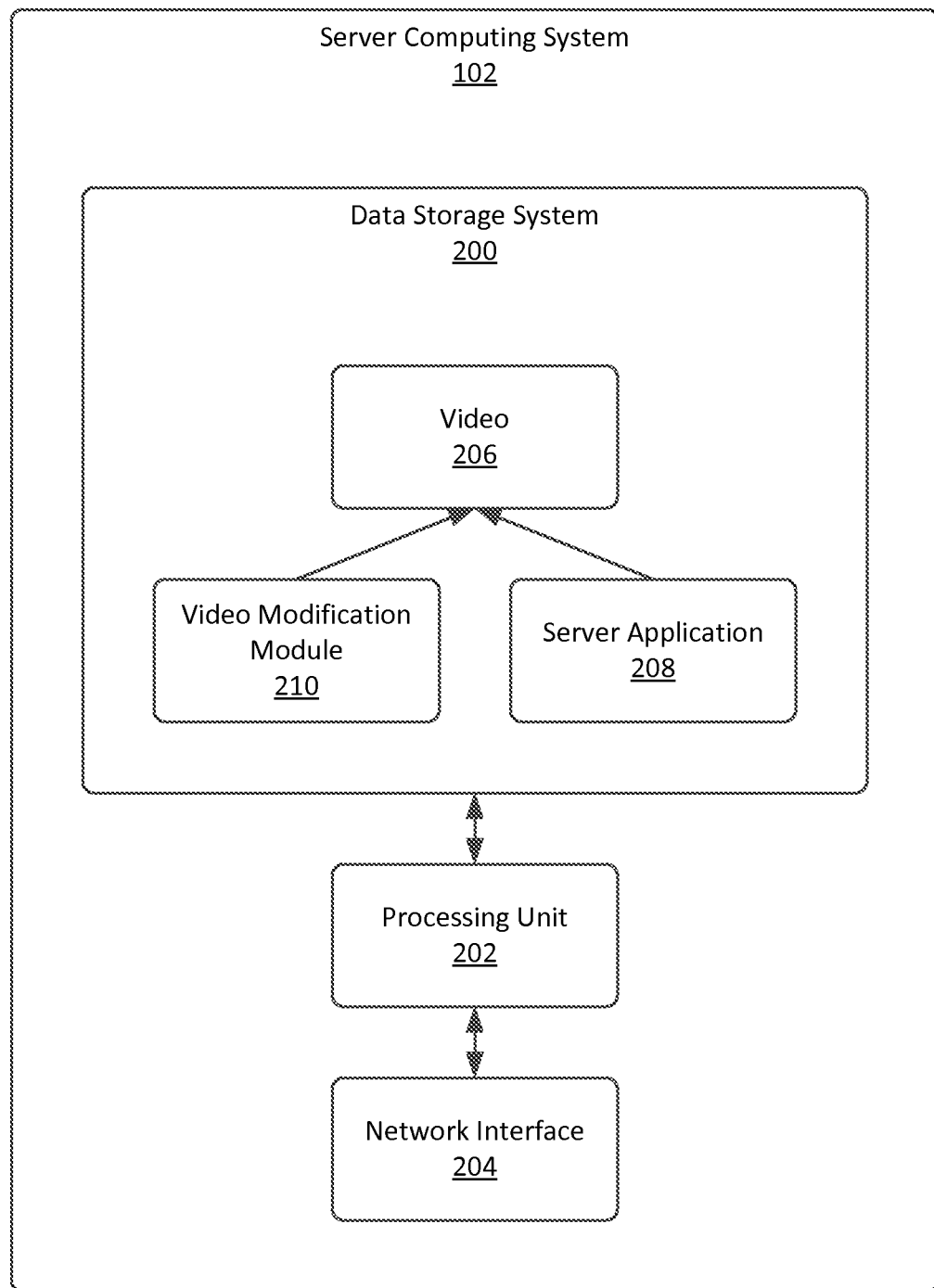
FIG. 2 illustrates example functional components of a server computing system.

FIG. 2 illustrates example functional components of the server computing system 102. It should be appreciated that FIG. 2 is an example provided for purposes of explanation only. In other instances, the server computing system 102 may contain different logical components. In some embodiments, a functional component is a sub-part of a system, the sub-part having a well-defined purpose and functionality.

As illustrated in the example of FIG. 2, the server computing system 102 comprises a data storage system 200, a processing unit 202, and a network interface 204. The network interface 204 enables the server computing system 102 to transmit data on the network 108 and to receive data from the network 108. In some embodiments, a network interface is a set of one or more physical network interface cards. Furthermore, in some embodiments, a network interface card is a computer hardware component designed to allow a computer to communicate over an electronic communication network. In some example embodiments, the network interface 204 is able to store data received from the network 108 directly into the data storage system 200 and to directly transmit on the network 108 data stored in the data storage system 200.

As illustrated in the example of FIG. 2, the data storage system 200 stores a video 206, a server application 208, and a video modification module 210. As mentioned above, the server computing system 102 comprises a collection of one or more electronic computing devices and the data storage system 200 comprises a collection of one or more computer-readable data storage media. In embodiments where the server computing system 102 comprises a plurality of electronic computing devices and the data storage system 200 comprises a plurality of computer-readable data storage media, the video 206, the server application 208, and the video modification module 210 may be stored at different computer-readable data storage media and potentially at computer-readable data storage media in different electronic computing devices. For instance, the server application 208 may be stored at a computer-readable data storage medium at a first server device at a server farm and the video modification module 210 may be stored at a plurality of computer-readable data storage media at a second server device in the server farm. In some embodiments, the video 206 can be stored as a single file, multiple files, in a database, or in another type of data structure.

In some example embodiments, the server application 208 comprises a set of software instructions. This disclosure includes statements that describe the server application 208 as performing various actions. Such statements should be interpreted to mean that the server computing system 102 performs the various actions when the processing unit 202 executes software instructions of the server application 208.

A software application comprises a set of software instructions that, when executed by a processing unit of a computing system, cause the computing system to provide a computerized tool with which a user can interact. Processing units comprise sets of one or more physical integrated circuits capable of executing software instructions. Software instructions are data structures that represent operations of a processing unit. For example, a software instruction may be a data structure comprising an operation code and zero or more operand specifiers. In this example, the operand specifiers may specify registers, memory addresses, or literal data.

The server application 208 receives resource requests from the network 108 via the network interface 204 and responds appropriately to the resource requests. Resource requests comprise requests to perform an action on a resource. Example types of resource requests include get requests that request the server application 208 to return copies of resources to computing systems, delete requests that request the server application 208 to delete resources, post requests that request the server application 208 to submit data to specified resources, and other types of requests to perform actions on resources. In addition, the server application 208 comprises software instructions that, when executed by the processing unit 202, cause the server computing system 102 to respond appropriately to the resource requests.

In the example of FIG. 2, the server application 208 receives a resource request from the one of the client devices 104. For ease of explanation, this document assumes that the server application 208 receives the resource request from the client device 104A. The resource request requests the video 206. In response to the resource request, the server application 208 transmits the video 206 to the client device 104A. The video data can be rendered as the video. In one example implementation, the server application 208 transmits a copy of the video 206 to the client device 104A. In another example implementation, the server application 208 transmits a video stream to the client device 104A. The video stream contains video data in the video 206.

In some example implementations, the video modification module 210 comprises a set of software instructions. This disclosure includes statements that describe the video modification module 210 as performing various actions. Such statements should be interpreted to mean that the server computing system 102 performs the various actions when the processing unit 202 executes software instructions of the video modification module 210. As described below, the video modification module 210 modifies the video 206 such that the video includes one or more advertisements and a target resource.

Figure 3:
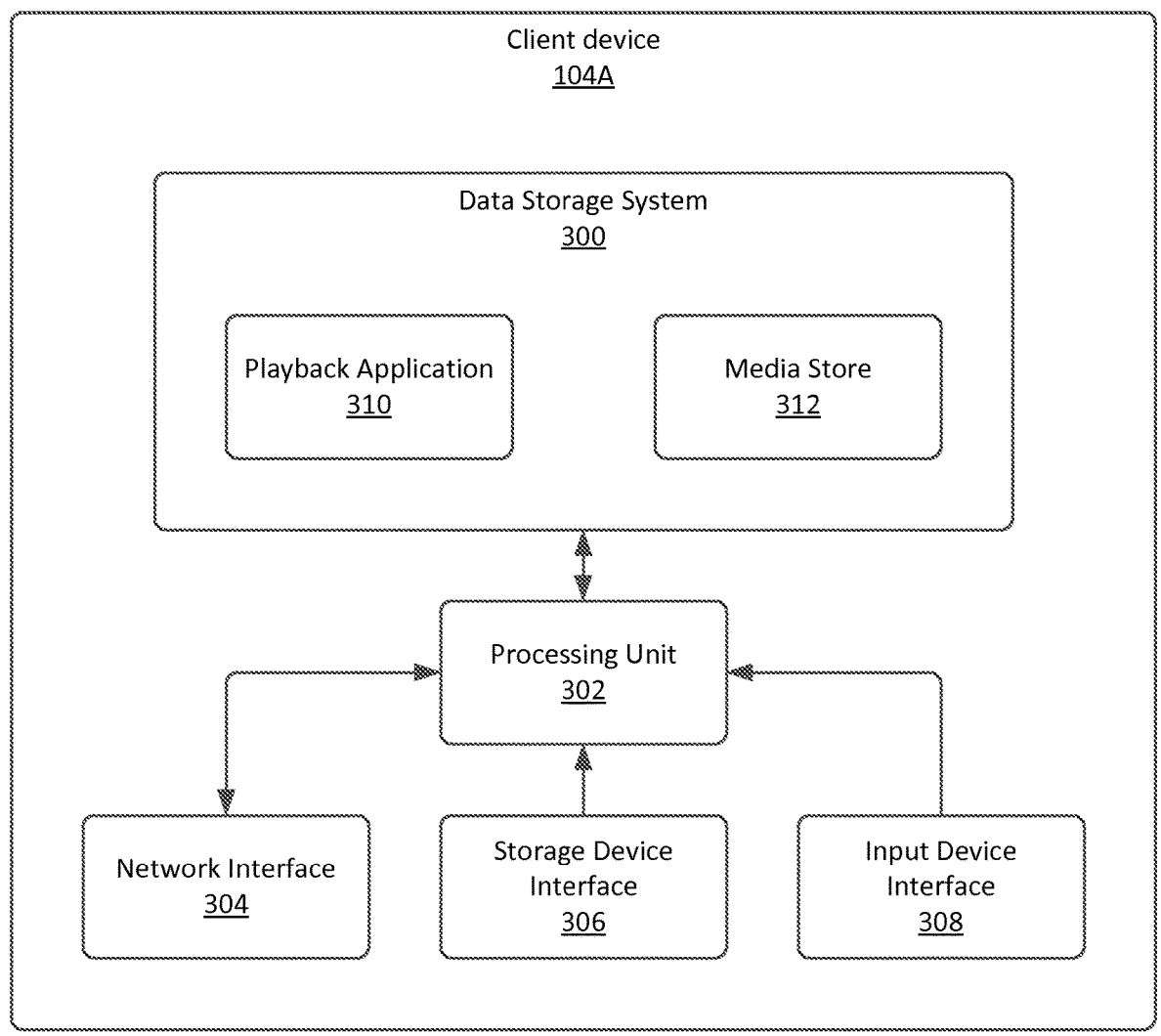
FIG. 3 illustrates example functional components of a client device.

FIG. 3 illustrates example functional components of the client device 104A. It should be appreciated that FIG. 3 is an example provided for purposes of explanation only. In other instances, the client device 104A may contain different logical components. Furthermore, the reader will understand that other ones of the client devices 104 can have similar functional components.

As illustrated in the example of FIG. 3, the client device 104A comprises a data storage system 300, a processing unit 302, a network interface 304, a storage device interface 306, and an input device interface 308. The data storage system 300 stores a playback application 310 and a media store 312. The network interface 304 enables the client device 104A to transmit data on the network 108 and to receive data from the network 108. The storage device interface 306 enables the client device 104A to read data from one or more computer-readable data storage media external to the client device 104A (i.e., an external data storage medium). The input device interface 308 enables the client device 104A to receive input from an input device controlled by the user 106A.

In some example embodiments, the playback application 310 comprises a set of software instructions. This disclosure includes statements describing the playback application 310 as performing various actions. Such statements should be interpreted to mean that the client device 104A performs the various actions when the processing unit 302 executes software instructions of the playback application 310. As described below, the playback application 310 plays back videos.

It should be appreciated that in alternate implementations, functional components of the client device 104A are implemented as separate physical electronic computing devices. For example, a first physical electronic computing device at a location of the user 106A may receive input from an input device control by the user 106A and transmit the input to a second physical electronic computing device via an electronic communications network. In this example, the second physical electronic computing device may process the input and the video data and transmit the processed video data to a third physical electronic computing device at the location of the user 106A. The third physical electronic computing device uses the processed video data to display the video. In this way, input processing and video processing appears, from the perspective of the user 106A, to be performed by the cloud.

The media store 312 stores video data on a temporary or persistent basis. In a first example, the media store 312 stores one or more video files. In a second example, the media store 312 stores video data received in a video stream. In a third example, the media store 312 stores software instructions of a video game application that generates video.

Figure 4:
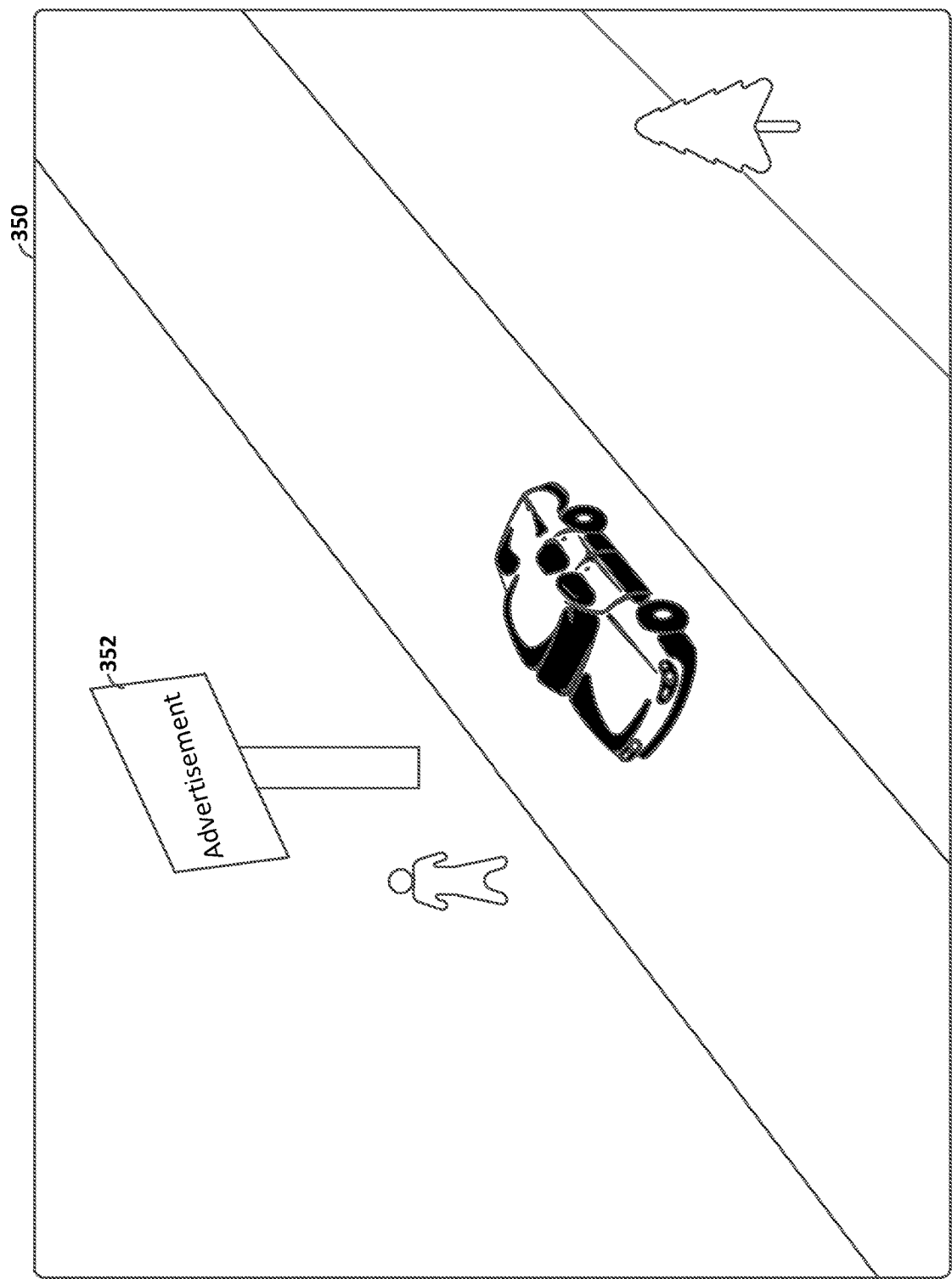
FIG. 4 illustrates an example video including an embedded advertisement.
Figure 5:
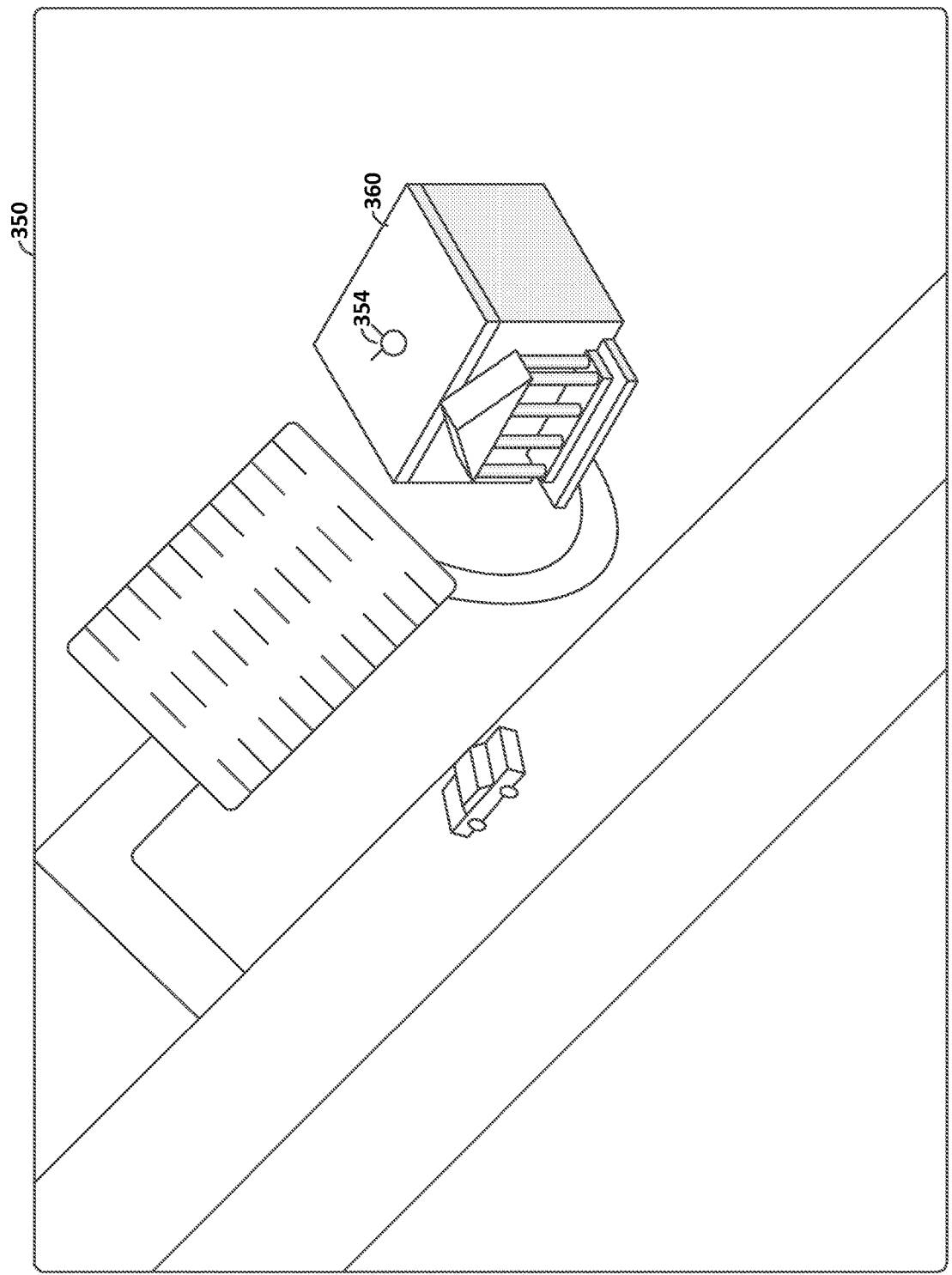
FIG. 5 illustrates another portion of the video of FIG. 4 including a hidden artifact.

FIGS. 4 and 5 illustrate one example of a video 350 into which an embedded advertisement and hidden artifact have been introduced. In FIG. 4, the video 350 is shown in a sequence including a billboard 352. The content of the billboard is replaced or overlaid with an embedded advertisement that is added at a point after which the video 350 was created. When the users 106 view the video 350, the users 106 see the billboard with the embedded advertisement.

In FIG. 5, another sequence of the video 350 is shown. In this sequence, the hidden artifact 354 has been embedded on top of a building 360. As the users 106 watch the video 350, the users 106 may see the hidden artifact 354. If the users 106 do see the hidden artifact 354, the users 106 can select the hidden artifact 354 to, for example, win a prize or enter a drawing, as described herein.

Various software components can be used to embed the advertising and the hidden artifact into the video. In one example, one or more of the following software products are used to embed the advertising and hidden artifact: Adobe® After Effects® CS4 and After Effects CS4 Mocha software from Adobe Systems Incorporated; Shake advanced digital compositing software from Apple Inc.; Boujou object tracking software from 2d3; 3D-Equalizer motion tracking software from Science.D.Visions; and MAYA® 3D modeling, animation, visual effects, and rendering software and Mental Ray® rendering engine software from Autodesk, Inc. Other tools can also be used.

Figure 6:
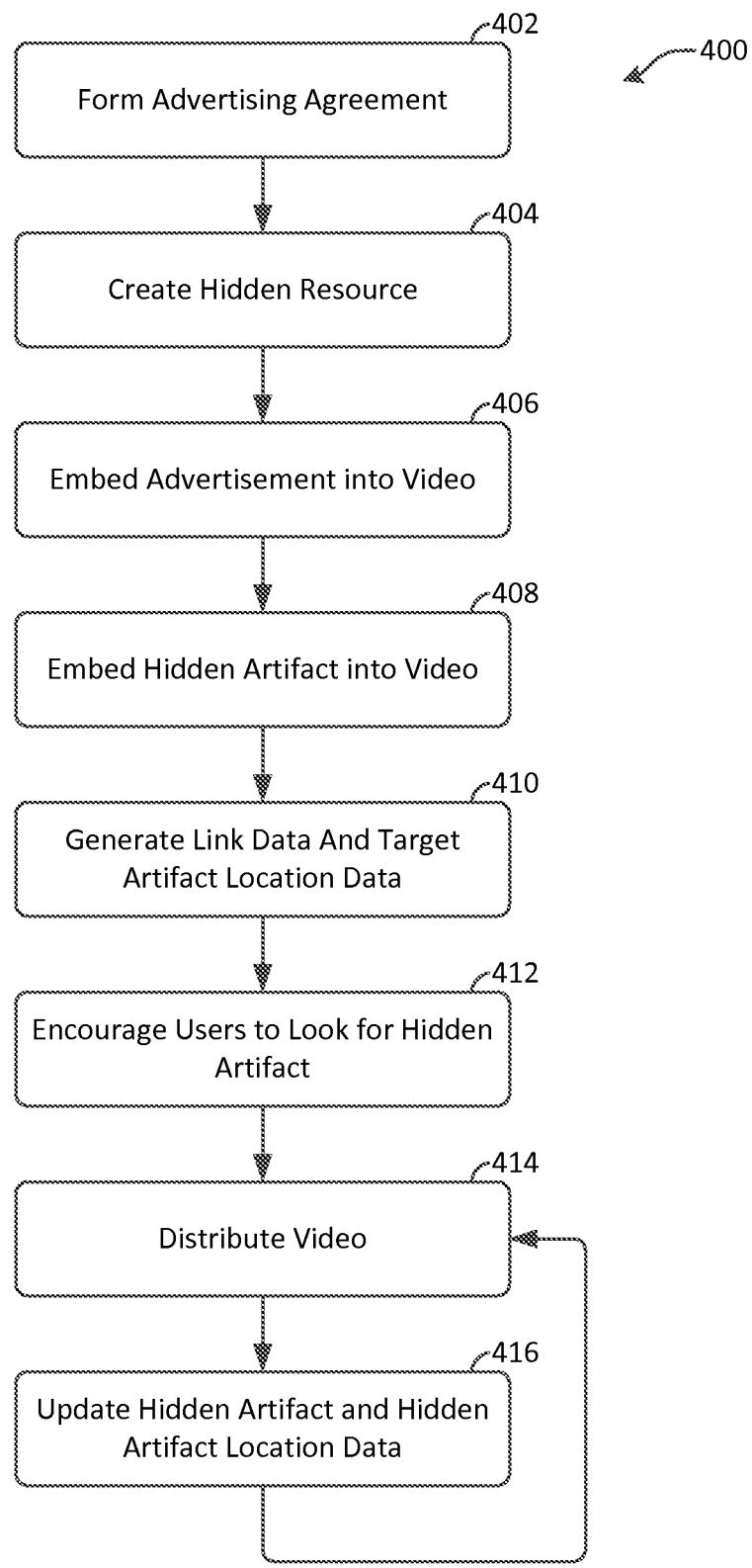
FIG. 6 illustrates an example operation of a distribution entity to distribute a video containing a hidden artifact designed to attract a user's attention to advertisements embedded in the video.

FIG. 6 illustrates an example operation 400 of the distribution entity 110 to distribute a video containing a hidden artifact designed to attract a user's attention to advertisements embedded in the video. It should be appreciated that the operation 400 is an example provided for purposes of explanation only. In other implementations, operations to distribute the video may involve more or fewer steps, or may involve the steps of the operation 400 in a different order. Furthermore, the operation 400 is explained with reference to FIGS. 1-3. It should be appreciated that other operations to distribute the video may be used in different systems and in computing systems having functional components other than those illustrated in the examples of FIGS. 1-3. For ease of explanation, this document describes the example of FIG. 6 with reference to the client device 104A and the user 106A. The operation 400 can be applicable to other ones of the client devices 104 and users 106.

As illustrated in the example of FIG. 6, the operation 400 begins when the distribution entity 110 forms an advertising agreement with one of the advertisers 112 (402). In some embodiments, the advertising agreement obligates the distribution entity 110 to distribute a video that includes an advertisement and a hidden artifact.

Next, the distribution entity 110 creates a target resource (404). In different instances, the distribution entity 110 uses different tools to create the target resource. For example, the distribution entity 110 may use a web page design application to create the target resource. In another example, the distribution entity 110 may use an application programming suite to build software instructions that, when executed, provide the target resource. In some instances, a party other than the distribution entity 110 creates the target resource. For example, the advertiser may be responsible for creating the target resource.

Pursuant to the advertising agreement, the distribution entity 110 embeds one or more advertisements into the video (406). In different instances, the distribution entity 110 embeds the advertisements into the video in different ways. In a first example implementation, the distribution entity 110 manually identifies appropriate regions of frames in the video for the advertisements. In this first example, the distribution entity 110 may then use the video modification module 210 or other video manipulation software to manually update the identified regions to include the advertisements. In a second example implementation, the distribution entity 110 embeds the advertisements in the video by using a software application that automatically identifies appropriate regions of frames in the video for the advertisements.

In this second example implementation, the software application may also automatically embed the advertisements in the identified regions.

It should be appreciated that, in some instances, the video may already contain the advertisements. In such instances, it may not be necessary for the distribution entity 110 or another entity to modify the video to contain the advertisements.

Next, the distribution entity 110 embeds a hidden artifact in the video (408). In different embodiments, the distribution entity 110 embeds the hidden artifact in the video in different ways. For instance, the distribution entity 110 may manually identify appropriate regions of frames and/or manually add the hidden artifact to the identified regions. In another instance, the distribution entity 110 may use a software application that automatically identifies appropriate regions of frames and/or automatically adds the hidden artifact to the identified regions. It should be appreciated that, in some instances, the video may already contain the hidden artifact. In such instances, it may not be necessary for the distribution entity 110 to modify the video to contain the hidden artifact.

The distribution entity 110 then generates link data and hidden artifact location data (410). The link data comprises data that indicates how to access target resource. The hidden artifact location data includes data that indicates where the hidden artifact is located in the video. In an instance where the video is distributed in a video file, the video file may contain the link data and the hidden artifact location data. In an instance where the video is distributed in a video stream, the link data and the hidden artifact location data may be streamed to the client device 104A as metadata in the video stream.

The distribution entity 110 then takes steps to encourage the users 106 to look for the hidden artifact in the video (412). As discussed above, the distribution entity 110 may take a wide variety of steps to encourage the users 106 to look for the hidden artifact in the video. For example, the distribution entity 110 may include messages in the video encouraging the users 106 to look for the hidden artifact in the video.

Next, the distribution entity 110 distributes the video (414). As discussed above, the distribution entity 110 may distribute the video in a variety of ways. For example, the distribution entity 110 can distribute the video by transmitting a video file or a video stream over an electronic communications network. In another example, the distribution entity 110 can distribute the video by selling or giving away computer-readable storage media on which video data representing the video is stored.

Subsequently, the distribution entity 110 updates the hidden artifact in the video and the hidden artifact location data (416). For example, the distribution entity 110 can change a location of the hidden artifact to a different location within a set of frames and/or to a different time within the video. In a second example, the distribution entity 110 encourages the users 106 to look for a different artifact in the video. In this second example, the distribution entity 110 updates the hidden artifact location data such that the client device 104A determines that the user 106A has selected the different hidden artifact. After updating the hidden artifact and the hidden artifact location data, the distribution entity 110 distributes the updated video (414).

The distribution entity 110 can continue to update the hidden artifact and the hidden artifact location data on a regular or irregular basis. Once a user locates the hidden artifact, the user could potentially post the location of the hidden artifact in a public forum such as the Internet or print media. Consequently, the general public could quickly find the hidden artifact and access the target resource without paying attention to the details of the video. As a result, the users who already know the location of the hidden artifact are less likely to notice the advertisements embedded in the video. Updating the hidden artifact and the hidden artifact location data in this manner may diminish this possibility at least to some extent.

Figure 7:
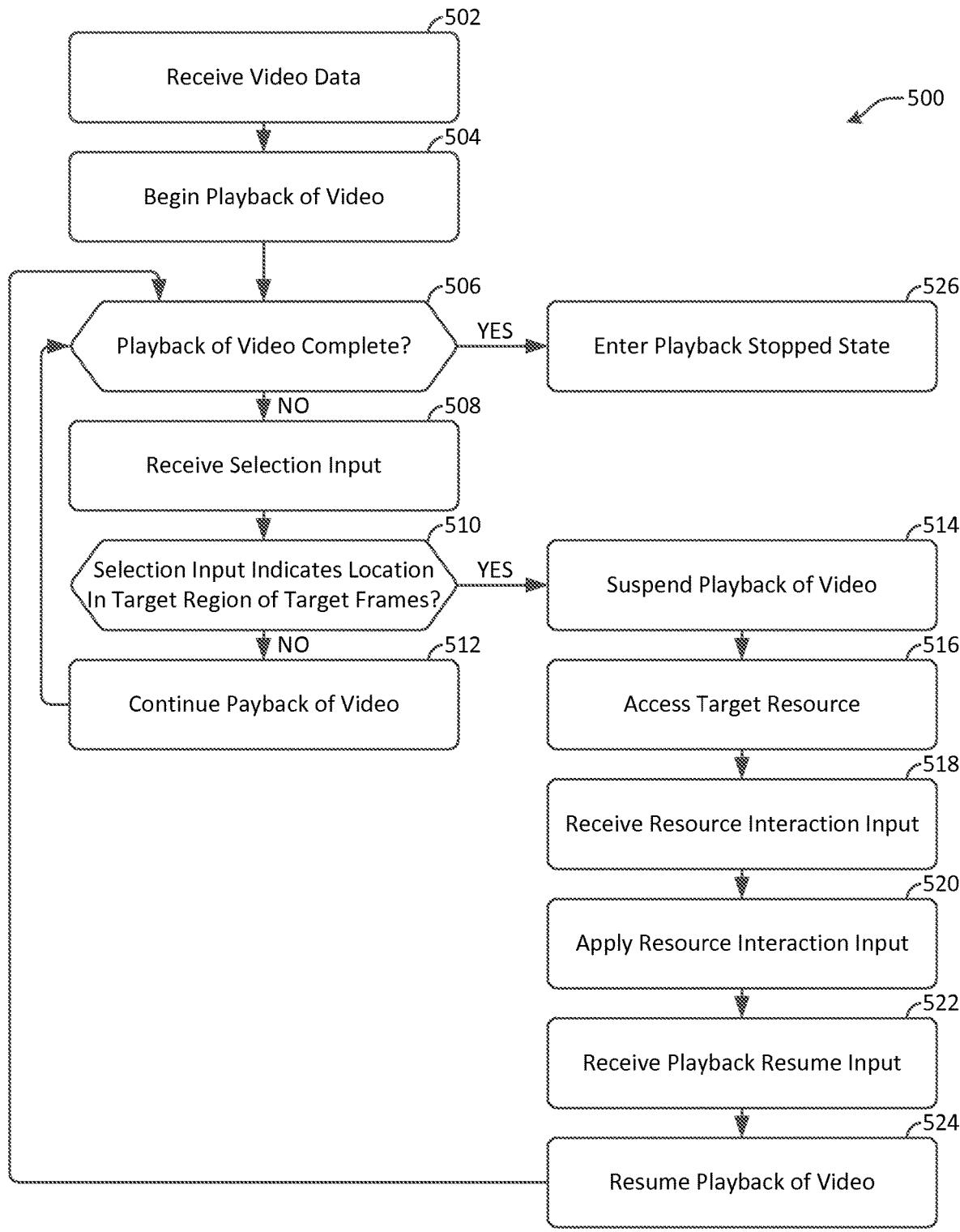
FIG. 7 illustrates an example operation of the client device to play back the video.

FIG. 7 illustrates an example operation 500 of the client device 104A to play back the video 206. It should be appreciated that the operation 500 is an example provided for purposes of explanation only. In other implementations, operations to play back the video 206 may involve more or fewer steps, or may involve the steps of the operation 500 in a different order. Furthermore, the operation 500 is explained with reference to FIGS. 1-3. It should be appreciated that other operations to play back the video 206 may be used in different systems and in computing systems having functional components other than those illustrated in the examples of FIGS. 1-3. Furthermore, the reader will understand that other ones of the client devices 104 can perform similar operations.

As illustrated in the example of FIG. 7, the operation 500 begins when the playback application 310 receives video data of the video 206 (502). As discussed above, the playback application 310 may receive video data in a variety of ways. For instance, the playback application 310 may receive video data from a video file stored at the data storage system 300, a video stream received via the network interface 304, read from a computer-readable data storage medium via the storage device interface 306, generated by executing software instructions, and so on.

After receiving at least some of the video data, the playback application 310 begins playback of the video (504). After the playback application 310 begins playback of the video 206, the playback application 310 determines whether playback of the video 206 is complete (506). Playback of the video 206 is complete when the playback application 310 has displayed the last frame of the video 206.

If playback of the video 206 is not complete ("NO" of 506), the playback application 310 is able to receive selection input from the user 106A (508). In other words, while the playback application 310 is playing back the video 206, the user 106A is able to provide selection input to the playback application 310.

In response to receiving the selection input, the playback application 310 determines whether the selection input indicates a location in a target region of a target frame (510). The target frame is a frame containing a hidden artifact. Furthermore, the target region in a frame is a region containing a hidden artifact. In some example embodiments, the playback application 310 uses the hidden artifact location data to determine whether the selection input indicates a location in a target region of a target frame.

If the playback application 310 determines that the selection input does not indicate a location in a target region of a target frame of the video 206 ("NO" of 510), the playback application 310 continues playback of the video (512). The playback application 310 then loops back and determines whether playback of the video 206 is complete (506). If the playback application 310 never receives selection input or never receives selection input indicating a target region of a target frame of the video 206, the playback application 310 may continue to loop through steps 506, 508, 510, and 512 until playback of the video 206 is complete.

On the other hand, if the playback application 310 determines that the selection input indicates a location in a target region of a target frame ("YES" of 510), the playback application 310 suspends playback of the video 206 (514). Suspending playback of the video 206 enables the user 106A to interact with the target resource and the resume viewing the video 206 after the user 106A is finished interacting with the target resource.

Next, the playback application 310 accesses the target resource (516). In some example embodiments, the playback application 310 uses link data to determine how to access the target resource. As described above, the playback application 310 may access the target resource in a wide variety of ways depending on the type of the target resource.

After accessing the target resource, the playback application 310 receives resource interaction input from the user 106A (518). The resource interaction input indicates things that the user 106A wants to do with the target resource. Because the target resource may be a wide variety of different types of resource, the resource interaction input may indicate a wide variety of things that the user 106A wants to do with the target resource. For example, if the target resource is a web page containing a web form, the resource interaction input may indicate data that the user 106A wants to enter into text boxes of the web form. In another example, if the target resource is a game, the resource interaction input may indicate actions that the user 106A wants to perform in the game.

In response to receiving the resource interaction input, the playback application 310 applies the resource interaction input to the target resource (520). Applying the resource interaction input to the target resource entails processing the resource interaction input in a manner appropriate for the target resource. Because the target resource may be a wide variety of different types of resource, the playback application 310 applies the resource interaction input in a wide variety of ways. For example, if the target resource is a web page containing a web form and the resource interaction input indicates data that the user 106A wants to enter into text boxes of the web form, the playback application 310 applies the resource interaction input by displaying the data in the text boxes. In another example, if the target resource is a game and the resource interaction input is a command to move a character in the game, the playback application 310 applies the resource interaction input by moving the character in the game.

Although not illustrated in the example of FIG. 7 for the sake of brevity, the playback application 310 may receive and apply many resource interaction inputs. Furthermore, it should be appreciate that there is no applicable resource interaction input for some target resources. For example, the target resource may simply be a message with a code that a user can enter in a web page to redeem a prize. In this example, the user 106A cannot provide resource interaction input to the message. In such instances, the operation 500 would not include steps 518 and 520.

Subsequently, the playback application 310 receives playback resume input from the user 106A (522). The playback resume input indicates to the playback application 310 that the user 106A wants to resume playback of the video 206. In response to receiving the playback resume input, the playback application 310 resumes playback of the video 206 (524). The playback application 310 then loops back and determines whether playback of the video 206 is complete (506). If playback of the video 206 is complete ("YES" of 506), the playback application 310 enters a playback stopped state (526).

Figure 8:
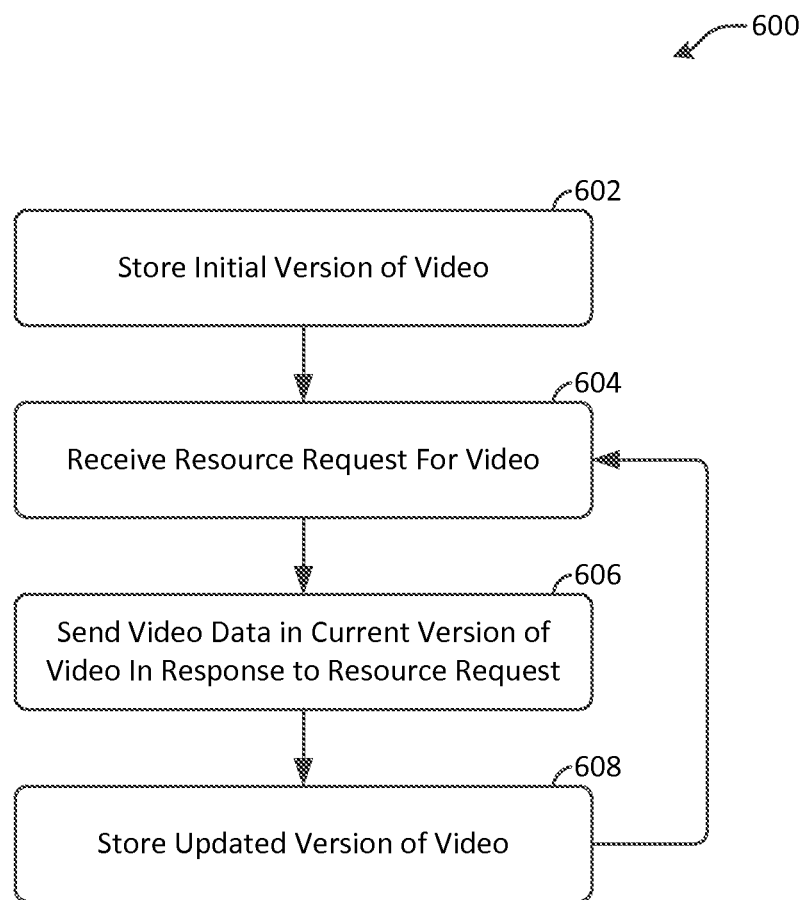
FIG. 8 illustrates an example operation of the server computing system to distribute the video.

FIG. 8 illustrates an example operation 600 of the server computing system 102 to distribute the video 206. It should be appreciated that the operation 600 is an example provided for purposes of explanation only. In other implementations, operations to distribute the video 206 may involve more or fewer steps, or may involve the steps of the operation 600 in a different order. Furthermore, the operation 600 is explained with reference to FIGS. 1-3. It should be appreciated that other operations to distribute the video 206 may be used in different systems and in computing systems having functional components other than those illustrated in the examples of FIGS. 1-3. For ease of explanation, this document describes the example of FIG. 8 with reference to the client device 104A and the user 106A. The operation 600 can be applicable to other ones of the client devices 104 and users 106.

As illustrated in the example of FIG. 8, the operation 600 starts when the server computing system 102 stores an initial version of the video 206 (602). After the server computing system 102 has stored the initial version of the video 206, the server application 208 receives a resource request for the video file (604). In response to receiving the resource request, the server application 208 transmits data of the video 206 to the client device 104A (606).

Subsequently, the server computing system 102 stores an updated version of the video 206 (608). The updated version of the video 206 contains updated video data. The updated video data, when rendered by a client device, plays back an updated video. The updated video is substantially the same as the initial version of the video, except that the updated video contains the hidden artifact at a location different than a location of the hidden artifact in the initial version of the video. In some instances, the updated version of the video 206 is accompanied by different hidden artifact location data.

After storing the updated version of the video 206, the server application 208 receives a second resource request (604). The second resource request may be from the client device 104A or a different client device. In response to the second resource request, the server application 208 transmits the updated video data in the updated version of the video 206. Although not illustrated in the example of FIG. 8 for purposes of clarity, the server application 208 may receive and respond to many resource requests before storing the updated version of the video 206.

Figure 9:
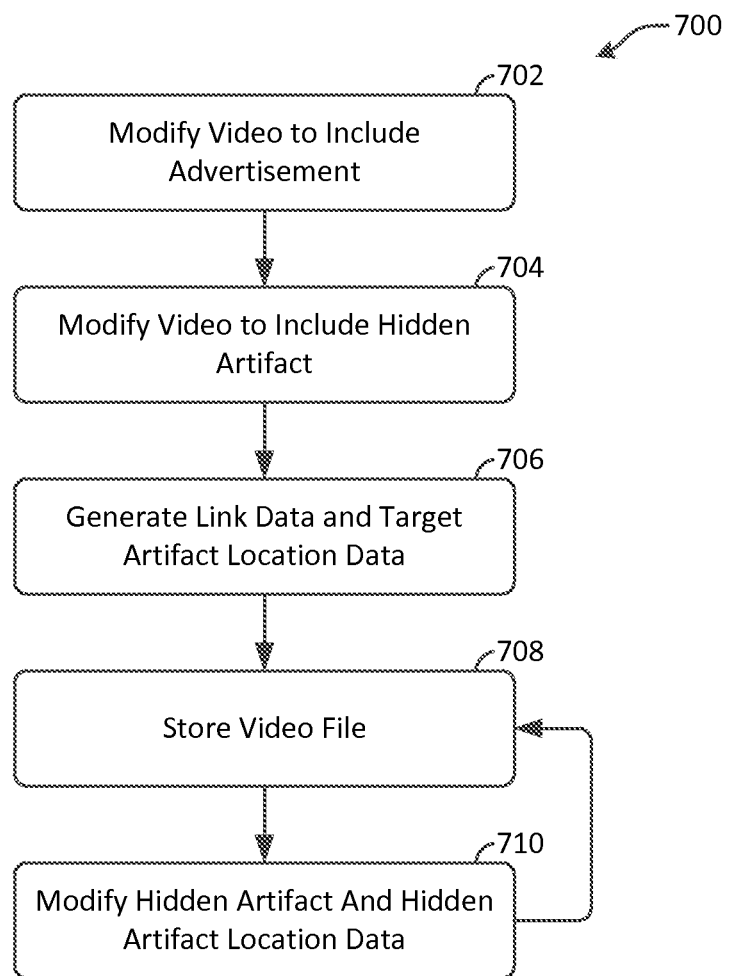
FIG. 9 illustrates an example operation of a video modification module to modify the video to contain the hidden artifact and the advertisements.

FIG. 9 illustrates an example operation 700 of the video modification module 210 to modify the video 206 to contain the hidden artifact and the advertisements. It should be appreciated that the operation 700 is an example provided for purposes of explanation only. In other implementations, operations to modify the video 206 may involve more or fewer steps, or may involve the steps of the operation 700 in a different order. Furthermore, the operation 700 is explained with reference to FIGS. 1-3. It should be appreciated that other operations to modify the video 206 may be used in different systems and in computing systems having functional components other than those illustrated in the examples of FIGS. 1-3.

In the example of FIG. 9, the operation 700 starts when the video modification module 210 modifies the video 206 such that the video includes at least one advertisement (702). The video modification module 210 may modify the video 206 such that the video 206 includes the advertisement in a variety of ways. In a first example implementation, the video modification module 210 automatically modifies the video 206 such that the video 206 includes the advertisement. In this first example implementation, a user provides the advertisement to the video modification module 210. The video modification module 210 then automatically identifies an appropriate location and time within the video 206 to display the advertisement and automatically adds the advertisement at the identified location and time. In this first example implementation, the video modification module 210 may automatically perform various graphics operations on the advertisement to make the advertisement appear natural in the video 206. Such graphics operations include shadowing, bump mapping, perspective skewing, motion blurring, anti-aliasing, stretching, and so on. In other example implementations, a user may interact more closely with the video modification module 210 to modify the video 206 such that the video 206 includes the advertisement. For instance, the user may manually interact with the video modification module 210 to instruct the video modification module 210 where and when to place the advertisement in the video 206 and/or what graphics operations to apply to the advertisement to make the advertisement appear natural in the video 206.

Next, the video modification module 210 modifies the video 206 such that the video 206 includes a hidden artifact (704). The video modification module 210 may modify the video 206 such that the video 206 includes the hidden artifact in a variety of ways. In a first example implementation, the video modification module 210 automatically modifies the video 206 such that the video 206 includes the hidden artifact. In this first example implementation, a user provides the hidden artifact to the video modification module 210. The video modification module 210 then automatically identifies an appropriate location and time within the video 206 to display the hidden artifact and automatically adds the hidden artifact at the identified location and time. In this first example implementation, the video modification module 210 may automatically perform various graphics operations on the hidden artifact to make the hidden artifact appear natural in the video 206. In other example implementations, a user may interact more closely with the video modification module 210 to modify the video 206 such that the video 206 includes the hidden artifact. For instance, the user may manually interact with the video modification module 210 to instruct the video modification module 210 where and when to place the hidden artifact in the video 206 and/or what graphics operations to apply to the hidden artifact to make the hidden artifact appear natural in the video 206.

After modifying the video 206 to include the hidden artifact, the video modification module 210 generates link data and hidden artifact location data (706). The video modification module 210 may generate the link data and the hidden artifact location data in a variety of ways. For example, the video modification module 210 may cause a display device to display a user interface that enables a user to create the link data and/or the hidden artifact location data. In another example, the video modification module 210 generates the link data and/or the hidden artifact location data automatically.

Subsequently, the video modification module 210 stores the video 206 at the data storage system 200 (708). After storing the video 206 at the data storage system 200, the video modification module 210 modifies the video 206 such that the hidden artifact is moved or such that the hidden artifact is replaced by another hidden artifact (710). As discussed above, moving or replacing the hidden artifact with another hidden artifact reduces the impact of distribution of knowledge regarding the location of the hidden artifact. In different implementations, the video modification module 210 modifies the video 206 such that the hidden artifact is moved or replace by another hidden artifact in different ways. For example, the video modification module 210 may automatically (i.e., without human intervention) modify the video 206 such that the hidden artifact is moved or such that the hidden artifact is replaced by another hidden artifact. In another example, the video modification module 210 may modify the video 206 such that the hidden artifact is moved or such that the hidden artifact is replaced by another hidden artifact in response to human interaction with the video modification module 210. After modifying the video 206 such that the hidden artifact is moved or such that the hidden artifact is replaced by another hidden artifact, the video modification module 210 again stores the video file (708). Steps 708 and 710 may recur an indefinite number of times.

In some examples, multiple runs or variations in the placement of the advertising and hidden artifacts can be made. For example, a first run of the movie can be made with a first set of advertisers, and a second run can be made with a different set of advertisers. The first run movie can be distributed for a certain number of users or for a certain amount of time, and then the second run movie can be used.

Likewise, multiple variations of the movie with different placement of the hidden artifacts can be used. In such an example, the multiple variations can each be distributed for a period of time, or all can be randomly distributed to users.

Figure 10:
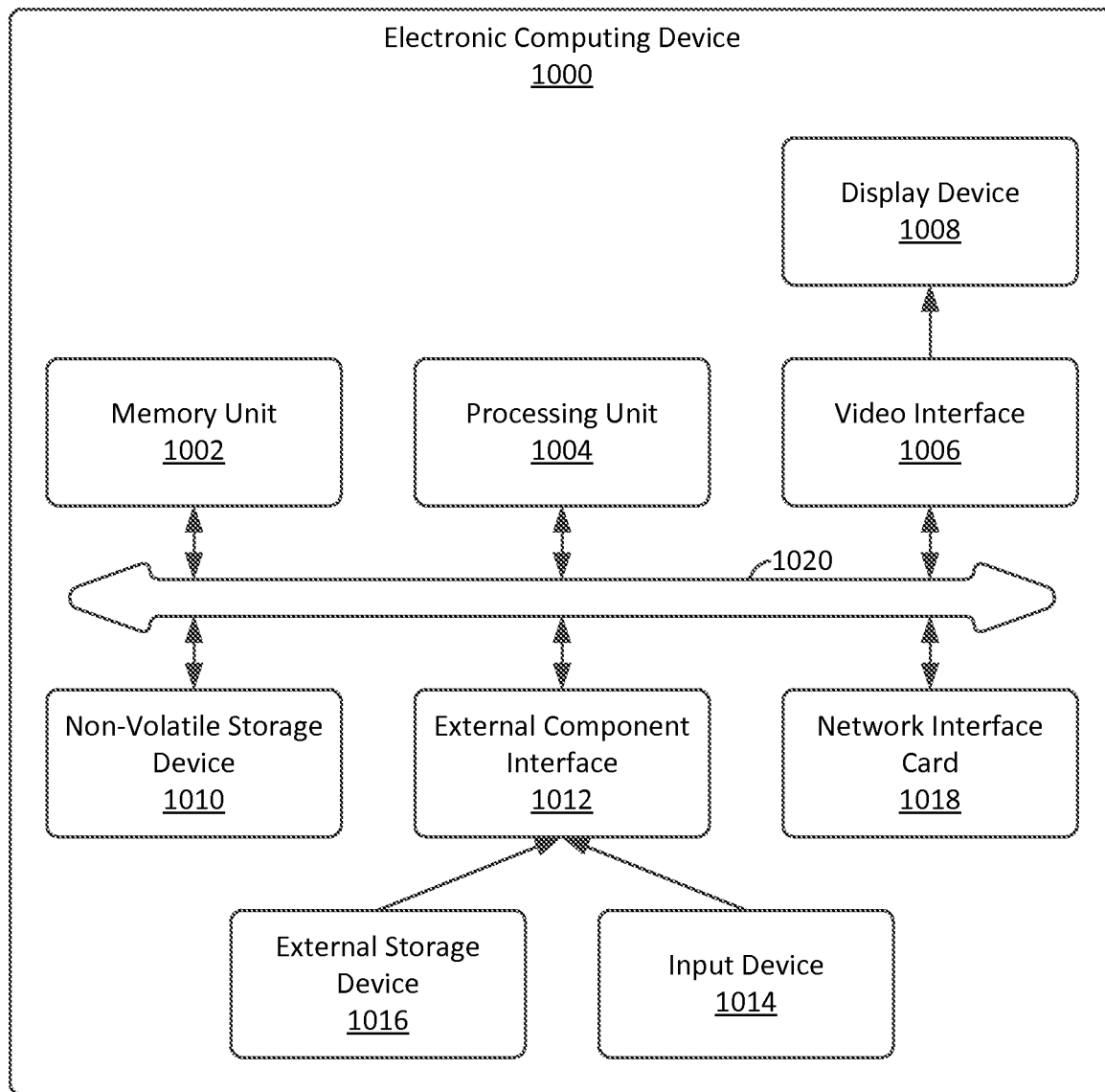
FIG. 10 illustrates example physical components of an electronic computing device.

FIG. 10 illustrates example physical components of an electronic computing device 1000. It should be appreciated that the electronic computing device 1000 is merely one example. Other electronic computing devices may include more or fewer physical components and may be organized in different ways. The server computing system 102 may include one or more electronic computing devices like the electronic computing device 1000. The client devices 104 may be implemented like the electronic computing device 1000.

As illustrated in the example of FIG. 10, the electronic computing device 1000 comprises a memory unit 1002. The memory unit 1002 is a computer-readable data storage medium capable of storing data and/or instructions. The memory unit 1002 may be a variety of different types of computer-readable storage media including, but not limited to, dynamic random access memory (DRAM), double data rate synchronous dynamic random access memory (DDR SDRAM), solid state memory devices, reduced latency DRAM, DDR2 SDRAM, DDR3 SDRAM, Rambus RAM, or other types of computer-readable storage media.

In addition, the electronic computing device 1000 comprises a processing unit 1004. As mentioned above, a processing unit is a set of one or more physical electronic integrated circuits that are capable of executing instructions. In a first example, the processing unit 1004 may execute software instructions that cause the electronic computing device 1000 to provide specific functionality. In this first example, the processing unit 1004 may be implemented as one or more processing cores and/or as a set of microprocessors, the set of microprocessors comprising at least one microprocessor. For instance, in this first example, the processing unit 1004 may be implemented as one or more Intel Core 2 microprocessors. The processing unit 1004 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, the processing unit 1004 may be implemented as an ASIC that provides specific functionality. In a third example, the processing unit 1004 may provide specific functionality by using an ASIC and by executing software instructions.

The electronic computing device 1000 also comprises a video interface 1006. The video interface 1006 enables the electronic computing device 1000 to output video information to a display device 1008. The display device 1008 may be a variety of different types of display devices. For instance, the display device 1008 may be a cathode-ray tube display, an LCD display panel, a plasma screen display panel, a touch-sensitive display panel, a LED array, an Organic LED (OLED) screen, or another type of display device.

In addition, the electronic computing device 1000 includes a non-volatile storage device 1010. The non-volatile storage device 1010 is a computer-readable data storage medium that is capable of storing data and/or instructions. The non-volatile storage device 1010 may be a variety of different types of non-volatile storage devices. For example, the non-volatile storage device 1010 may be one or more hard disk drives, solid state memory devices, magnetic tape drives, CD-ROM drives, DVD-ROM drives, Blu-ray disc drives, or other types of non-volatile storage devices.

The electronic computing device 1000 also includes an external component interface 1012 that enables the electronic computing device 1000 to communicate with external components. As illustrated in the example of FIG. 10, the external component interface 1012 enables the electronic computing device 1000 to communicate with an input device 1014 and an external storage device 1016. In one implementation of the electronic computing device 1000, the external component interface 1012 is a Universal Serial Bus (USB) interface. In another example implementation of the electronic computing device 1000, the external component interface 1012 is a FireWire interface. In other implementations of the electronic computing device 1000, the electronic computing device 1000 may include another type of interface that enables the electronic computing device 1000 to communicate with input devices and/or output devices. For instance, the electronic computing device 1000 may include a PS/2 interface. The input device 1014 may be a variety of different types of devices including, but not limited to, keyboards, mice, trackballs, stylus input devices, touch pads, touch-sensitive display screens, or other types of input devices. The external storage device 1016 may be a variety of different types of computer-readable data storage media including magnetic tape, flash memory modules, magnetic disk drives, optical disc drives, solid state memory devices, and other computer-readable data storage media.

In addition, the electronic computing device 1000 includes a network interface card 1018 that enables the electronic computing device 1000 to transmit data to and receive data from an electronic communication network. The network interface card 1018 may be a variety of different types of network interface. For example, the network interface card 1018 may be an Ethernet interface, a token-ring network interface, a fiber optic network interface, a wireless network interface (e.g., a WiFi interface, a WiMax interface, Third Generation (3G) and Fourth Generation (4G) wireless communication interfaces, a Universal Mobile Telecommunications System interface, a CDMA2000 interface, an Evolution-Data Optimized interface, an Enhanced Data rates for GSM Evolution (EDGE) interface, etc.), or another type of network interface.

The electronic computing device 1000 also includes a communications medium 1020. The communications medium 1020 facilitates communication among the various components of the electronic computing device 1000. The communications medium 1020 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, FireWire, Integrated Drive Electronics (IDE), elastic interface buses, a QuickRing bus, a Controller Area Network bus, a Scalable Coherent Interface bus, a USB bus, an Ethernet connection, a Small Computer System Interface (SCSI) interface, or another type of communications medium.

The electronic computing device 1000 includes several computer-readable data storage media (i.e., the memory unit 1002, the non-volatile storage device 1010, and the external storage device 1016). Together, these computer-readable storage media may constitute a single data storage system. As discussed above, a data storage system is a set of one or more computer-readable data storage mediums. This data storage system may store instructions executable by the processing unit 1004. Activities described in the above description may result from the execution of the instructions stored on this data storage system. Thus, when this description says that a particular logical module performs a particular activity, such a statement may be interpreted to mean that instructions of the logical module, when executed by the processing unit 1004, cause the electronic computing device 1000 to perform the activity. In other words, when this description says that a particular logical module performs a particular activity, a reader may interpret such a statement to mean that the instructions configure the electronic computing device 1000 such that the electronic computing device 1000 performs the particular activity.

Figure 11:
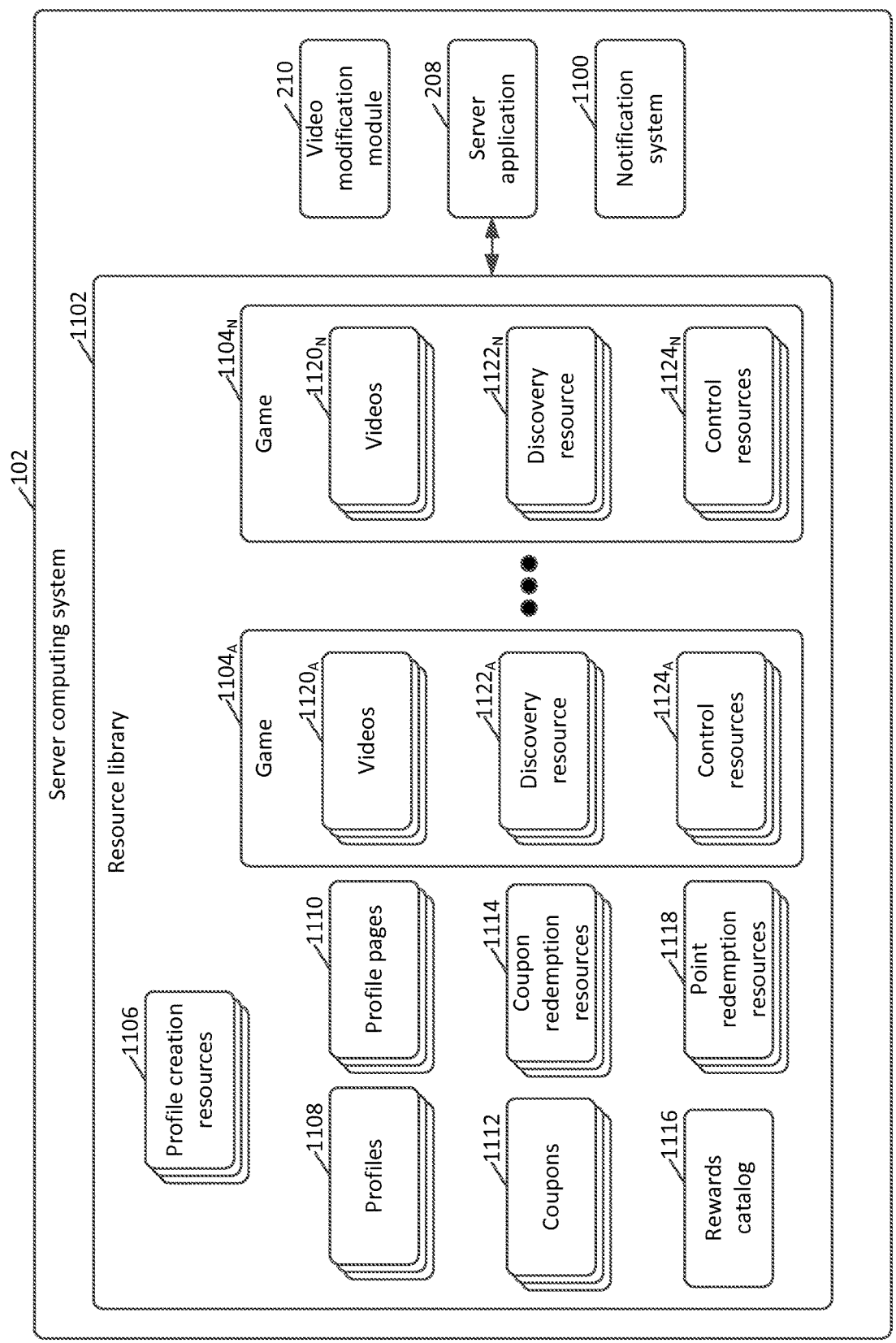
FIG. 11 illustrates an example block diagram illustrating an alternative embodiment of the server computing system.

FIG. 11 is a block diagram illustrating an alternative embodiment of the server computing system 102. This alternate embodiment enables the users 106 to play games that involve finding hidden artifacts. In these games, the server computing system 102 presents one or more videos to the users 106. The videos include hidden artifacts and advertisements. When the users 106 find the hidden artifacts in the videos, the users 106 select locations in the videos that correspond to the hidden artifacts. In other words, the users 106 select locations reasonably close to regions in the videos that contain the hidden artifacts. When one of the users 106 selects one of the hidden artifacts, the server computing system 102 receives selection input indicating a location in the video that corresponds to the selected artifact.

Because there are multiple hidden artifacts, the server computing system 102 can receive a plurality of selection inputs from the user. These selection inputs indicate locations in the videos that correspond to a plurality of selected artifacts. The selected artifacts are among the hidden artifacts in the videos. For example, if there are ten hidden artifacts, the selected artifacts can include all ten of the hidden artifacts or fewer than all ten of the hidden artifacts.

The server computing system 102 performs different actions depending on which ones of the hidden artifacts are among the plurality of selected artifacts. For example, the server computing system 102 can provide different rewards to a user depending on which ones of the hidden artifacts were found by the user. For instance, the server computing system 102 can provide a first reward to the user if the user finds one combination of the hidden artifacts and can provide a different reward to the user if the user finds a different combination of the hidden artifacts. Thus, the outcomes of playing the games can depend on which ones of the hidden artifacts the user finds.

The server computing system 102 can enable the users 106 to play various types of games. For example, a given game can have a race-to-the-finish format. Games having the race-to-the-finish format start at a particular time and continue until a predetermined event occurs. Example predetermined events can include a user find all hidden resources in videos of the given game, a particular number or percentage of users finding all the hidden resources in the videos, a user has found hidden resources in the videos 1120 worth a particular number of points, and so on.

In another example, a game can have a tournament format. Games having the tournament format have multiple rounds. A user can qualify for a later round by performing particular actions. For example, a user can qualify for a later round by finding all hidden artifacts in one of the videos within a given time limit. In other words, the server application 208 can provide the user with an opportunity to participate in the next round of the tournament when particular ones of the hidden artifacts are selected. In another example, a user can qualify for a later round by being among the first users to hidden artifacts worth a given number of points.

In yet another example, the given can have an instant win format. Users can win games having the instant win format by finding particular hidden artifacts in the videos.

As illustrated in the example of FIG. 11, the server computing system 102 provides the server application 208, the video modification module 210, a notification system 1100, and a resource library 1102. The server computing system 102 provides the server application 208, the video modification module 210, and the notification system 1100 when one or more processing units in the server computing system 102 execute appropriate software instructions. The resource library 1102 contains a set of resources. Resources in the resource library 1102 can be stored in the data storage system 200 within the server computing system 102 or in one or more other data storage systems accessible to the server computing system 102.

In the example of FIG. 11, the resource library 1102 includes profile creation resources 1106, profiles 1108, profile pages 1110, coupons 1112, coupon redemption resources 1114, a rewards catalog 1116, and point redemption resources 1118. In other embodiments, the resource library 1102 may include other types of resources or may not include each of these types of resources.

In addition, the resource library 1102 stores resources associated with games 1104A through 1104N (collectively, "games 1104"). The games 1104 can have various formats. For example, one of the games 1104 can correspond to a game having a race-to-the-finish format and another one of the games 1104 can have an instant-win format. In another example, one of the games 1104 can have a tournament format and another one of the games 1104 can have the tournament format.

In some instances, the different games correspond to different advertising campaigns. For example, one of the games 1104 can correspond to an advertising campaign for a coffee house chain and another one of the games 1104 can correspond to an advertising campaign for an automobile maker. In this example, the games 1104 can have the same or different formats.

Each of the games 1104 is associated with one or more videos 1120, one or more discovery resources 1122, and one or more control resources 1124. In the example of FIG. 11, the reference numbers of the videos 1120, the discovery resources 1122, and the control resources 1124 have alphabetical suffixes that correspond to the alphabetical suffixes of the reference numbers of their associated games.

Within each of the games 1104, the users 106 search for hidden artifacts in the videos 1120 of the game. For example, the users 106 who play the game 1104A search for hidden artifacts in the videos 1120 associated with the game 1104A. The discovery resources 1122 of the games 1104 correspond to hidden artifacts in the videos 1120 of the games 1104. The discovery resources 1122 specify discovery operations. The server application 208 performs the discovery operations of the discovery resources 1122 when the users 106 find the corresponding hidden artifacts in the videos 1120. For example, the server application 208 can award points to the users 106 when the users 106 find the corresponding hidden artifacts in the videos 1120. The control resources 1124 specify pre-playback operations and post-playback operations. The server application 208 performs the pre-playback operations of the control resources 1124 before presenting the videos 1120. The server application 208 performs the post-playback operations of the control resources 1124 after presenting the videos 1120.

Each of the profiles 1108 corresponds to a different one of the users 106. Each of the profiles 1108 stores data regarding the corresponding user. For example, each of the profiles 1108 can store a point total for the corresponding user. In another example, the profiles 1108 can store demographic information, contact information, payment card information, social networking service connectivity information, and/or other information about the corresponding users.

In some embodiments, the profiles 1108 also include information about the habits of the corresponding users. For example, a given one of the profiles 1108 can correspond to a given user. In this example, the given profile can include information that indicates which ones of the videos 1120 the given user has watched, what time of day the given user watched the videos 1120, what types of prizes the given user tends to play for, what types of prizes the given user tends to win, what other users 106 of the media distribution system 100 the given user interacts with, what coupons the given user has downloaded, what products the given user has purchased using points, and/or other information about the habits of the given user. Thus, the profiles 1108 can be used to track viewing habits of the users 106.

Various embodiments implement the profiles 1108 in various ways. For example, the profiles 1108 can comprise XML documents, database records, flat files, or other types of data structures.

The notification system 1100 provides notification messages to the users 106. In various embodiments, the notification messages can have various formats and contain various messages. For example, the notification system 1100 can provide SMS text messages to the users 106 alerting the users 106 that one of the games 1104 is starting. In another example, the notification system 1100 can provide email messages to the users 106 alerting the users 106 about the availability of new games.

Figure 12:
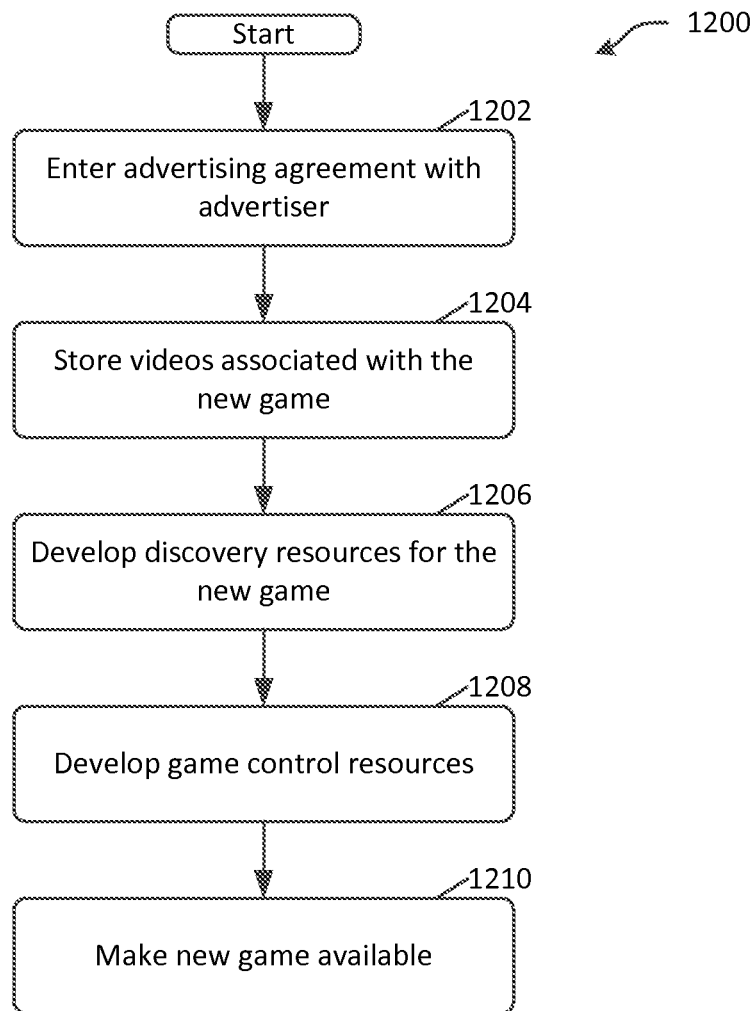
FIG. 12 is a flowchart of an example operation performed by the distribution entity.

FIG. 12 is a flowchart illustrating an example operation 1200 performed by the distribution entity 110. After the operation 1200 starts, the distribution entity 110 enters an advertising agreement with one of the advertisers 112 (1202). In some embodiments, the advertising agreement obligates the distribution entity 110 to provide a new game that involves finding hidden artifacts in videos. For ease of explanation, the following discussion uses the reference number 1104A to refer to the new game.

After receiving entering the advertising agreement, the distribution entity 110 stores the one or more videos 1120A associated with the game 1104A (1204). The videos 1120A include hidden artifacts and advertisements. In some instances, the hidden artifacts are advertisements. In other instances, the hidden artifacts are not advertisements per se. In such instances, the videos 1120A can contain advertisements separate from the hidden artifacts.

In some instances, the distribution entity 110 modifies the videos 1120A to include the hidden artifacts and/or the advertisements. In other instances, the original versions of the videos 1120A already contain the advertisements and/or the hidden artifacts. In such instances, it may not be necessary for the distribution entity 110 to modify the videos 1120A to include the advertisements and/or the hidden artifacts.

Furthermore, after the distribution entity 110 enters the advertising agreement, the distribution entity 110 develops the discovery resources 1122A of the game 1104A (1206). Each of the discovery resources 1122A corresponds to a different hidden artifact. Each of the discovery resources 1122A specifies a discovery operation. The discovery operation of a discovery resource is performed when a user finds the hidden resource that corresponds to the discovery resource. For example, the discovery operation can increase a user's point total when the user selects a region of a video containing a corresponding hidden artifact.

In various embodiments, the distribution entity 110 develops the discovery resources 1122A of the new game in various ways. For example, the distribution entity 110 can develop the discovery resources 1122A using an object-oriented programming language. Example object-oriented programming languages include C++, Java, C#, Python, Ruby, and so on. In this example, the discovery resources 1122A can be software objects having a same software interface. The software interface comprises a predefined collection of methods and attributes that other software components, such as the server application 208, can use to interact with the discovery resources 1122A. In this example, the discovery resources 1122A can be pluggable because each of the discovery resources 1122A has the same software interface.

In another example, the distribution entity 110 can develop the discovery resources 1122A as sets of scripts in various scripting languages. Example scripting languages include JavaScript, Perl, XUL, and so on.

In yet another example, the distribution entity 110 can develop the discovery resources 1122A using markup languages. For example, each of the discovery resources 1122A can comprise an XML document. In this example, the XML documents can specify parameters that control which discovery operations the server application 208 performs.

Furthermore, the distribution entity 110 can develop the control resources 1124A for the game 1104A (1208). As described in greater detail elsewhere in this document, the control resources 1124A provide pre-playback and post-playback actions associated with the game 1104A. The pre-playback actions are actions associated with the game 1104A that are performed prior to the users 106 playing back the videos 1120A associated with the game 1104A. The post-playback actions are actions associated with the game 1104A that are performed after the users 106 have finished playing back the videos 1120A associated with the game 1104A.

In various embodiments, the distribution entity 110 can develop the control resources 1124A for the game 1104A in various ways. For example, the distribution entity 110 can develop the control resources 1124A using object-oriented programming languages, markup languages, or other types of languages.

After storing the videos 1120A, developing the discovery resources 1122A, developing the control resources 1124A, the distribution entity 110 distributes the game 1104A (1210). In various embodiments, the distribution entity 110 distributes the game 1104A in various ways. For instance, in some example embodiments, the distribution entity 110 distributes the game 1104A by making the videos 1120A, the discovery resources 1122A, and the control resources 1124A available for download from the server computing device 102. In some such embodiments, the client devices 104 can download video files corresponding to the videos 1120A. In other such embodiments, the server application 208 can stream the videos 1120A to the client devices 104. Furthermore, in this example, the client devices 104 can download the discovery resources 1122A and/or the control resources 1124A and perform the operations specified by the discovery resources 1122A and/or the control resources 1124A. Alternatively, in this example, the client devices 104 can request the server application 208 perform parts or all of the operations specified by the discovery resources 1122A and/or the control resources 1124A.

In other example embodiments, the distribution entity 110 distributes the game 1104A by manufacturing and distributing physical computer-readable storage media. In this example, the computer-readable storage media store the videos 1120A. In some such embodiments, the computer-readable storage media also store the discovery resources 1122A and/or the control resources 1124A. In such embodiments, the client devices 104 perform the operations specified by the discovery resources 1122A and/or the control resources 1124A. In other such embodiments, the client devices 104 send messages to the server application 208 that comprise requests for the server application 208 to perform some or all the operations specified by the discovery resources 1122A and/or the control resources 1124A.

Figure 13:
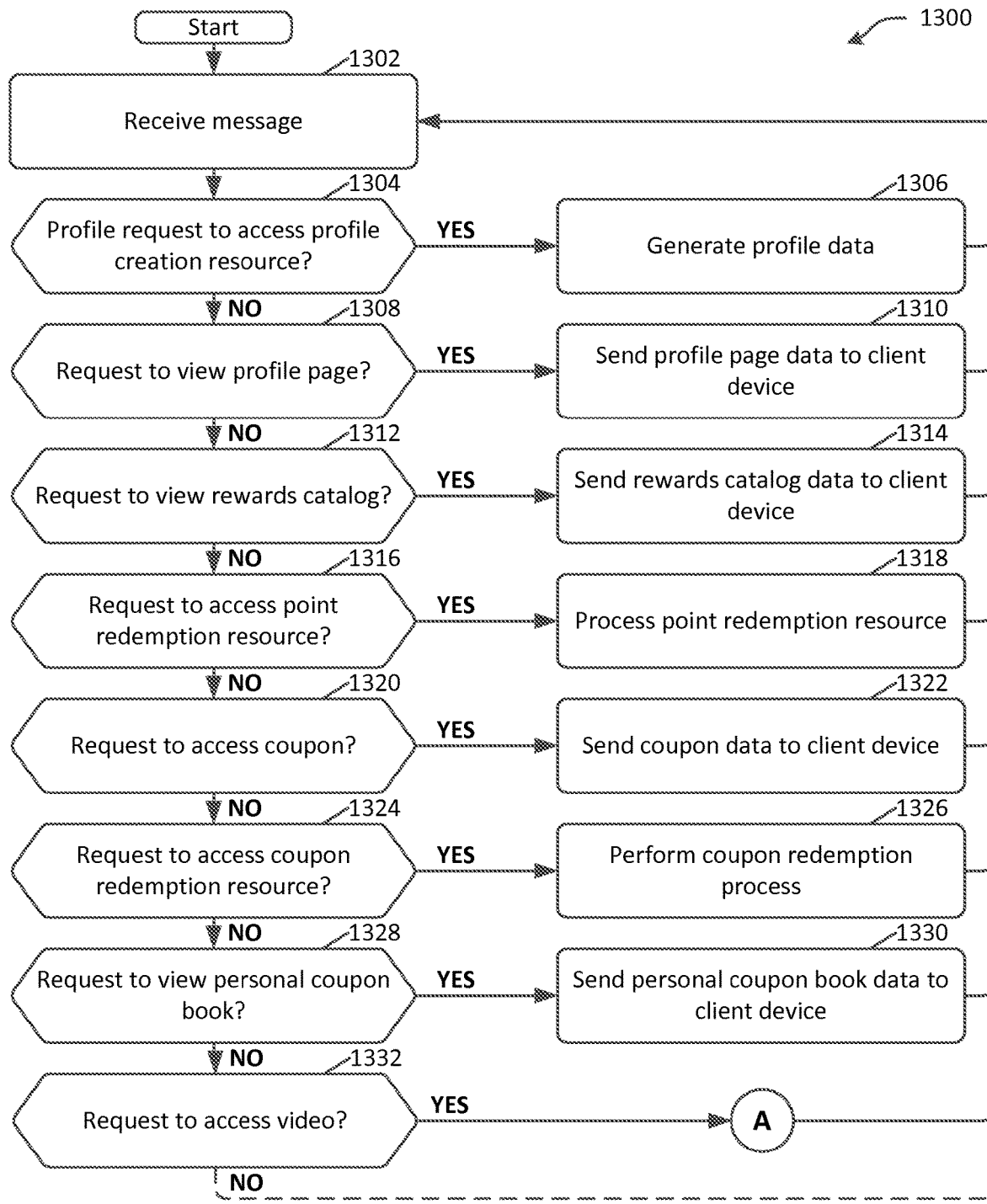
FIG. 13 is a flowchart of an example operation performed by the server application.

FIG. 13 is a flowchart of an example operation 1300 performed by the server application 208. The example operation 1300 is explained with reference to the client device 104A and the user 106A. Readers will appreciate that the operation 1300 can be applicable to other ones of the client devices 104 and users 106.

After the operation 1300 starts, the server application 208 receives a message from the client device 104A (1302). In various embodiments, the message can conform to various communication protocols. For example, the request can conform to the HTTP protocol, a propriety protocol, or another type of communication protocol. After the server application 208 receives the message, the server application 208 performs different actions depending on the content of the message.

If the message comprises a request to access a given one of the profile creation resources 1106 ("YES" of 1304), the server application 208 processes the given profile creation resource (1306). Processing the profile creation resource causes the server application 208 to establish a profile 1108 of the user 106A. In various embodiments, the profile creation resources 1306 are implemented in various ways. For example, one or more of the profile creation resources 1306 can comprise scripts. In such example, the scripts may be written in various interpreted programming languages, such as JavaScript, Perl, PHP, Ruby, and so on. In other instances, the profile creation resources 1306 can comprise as compiled programs written in programming languages such as C++, Java, Basic, and so on. The server application 208 persists the profile 1108 during times when the videos 1120 are not being presented to the user 106A.

In some embodiments, the server application 208 collects personal data about the user 106A when the server application 208 establishes the profile 1108 for the user 106A. For example, the server application 208 can collect name information, contact information, payment card information, information regarding the interests and tastes of the user 106A, demographic information, and/or other information about the user 106A. In such embodiments, the server application 208 adds such personal data to the profile 1108 of the user 106A. In some embodiments, the personal data can be used to generate a marketing profile of the user 106A. The marketing profile of the user 106A can be useful in marketing products to the user 106A and other people with similar characteristics.

Otherwise, if the message comprises a request to access one of the profile pages ("YES" of 1308), the server application 208 sends the profile page data to the client device 104A (1310). The profile page data represents a profile page 1110 of the user 106A. In some embodiments, the profile pages 1110 are webpages that contain data specific to the users 106. For example, the profile pages 1110 can include a total number of points earned by the users 106. In another example, the profile pages 1110 can include lists of games played by the users 106 and the numbers of points earned in the games. In yet another example, the profile pages 1110 can include links to games that might be interesting to the users 106. In yet another example, the profile pages 1110 can include data indicating what games have been played by people connected to the users 106 in social networking services, such as Facebook. In this example, the profile pages 1110 also include data indicating what rewards have been won by people connected to the users 106 in the social networking services. In yet another example, the profile pages 1110 can include lists of coupons available to the users 106 and lists of coupons redeemed by the users 106.

If the message comprises a request to access the rewards catalog 1116 (1312), the server application 208 sends rewards catalog data to the client device 104A (1314). The rewards catalog data represents the rewards catalog 1116. The rewards catalog 1116 comprises a list of rewards that the users 106 can get by redeeming points accumulated by playing the games 1104. For example, the rewards catalog 1116 can include a gift certificate that the users 106 can obtain by redeeming fifty points.

The rewards catalog 1116 can include a variety of rewards. For example, the rewards catalog 1116 can include gift certificates, coupons, raffle tickets, contest entries, physical prizes, cash, tickets, VIP access to various locations, access to special features of videos or games, travel, clues or hints regarding the locations of hidden artifacts in the videos 1120 or the real world, and other resources.

In some embodiments, the rewards in the rewards catalog 1116 are tied to advertising campaigns. For example, the rewards catalog 1116 includes items associated with products being marketed by the advertisers 112. In this example, if one of the advertisers 112 is running an advertising campaign for a particular store, the rewards catalog 1116 can include gift certificates redeemable at the particular store. In another example, the rewards catalog 1116 can include promotional items associated with an advertising campaign.

If the message comprises a request to access one of the point redemption resources 1118 ("YES" of 1316), the server application 208 processes the point redemption resource (1318). When the server application 208 processes one of the point redemption resources 1118 in response to the message from the user 106A, the server application 208 reduces a given number of points from the point total of the user 106A and performs one or more actions to provide the reward associated with the given point redemption resource to the user 106A.

The server application 208 can provide different rewards to the user 106A depending on whether the point total of the user 106A exceeds various thresholds. For example, if the point total of the user 106A exceeds a first threshold (e.g., 100 points), the server application 208 can provide a first reward to the user 106A (e.g., a $10 gift card). In another example, if the point total of the user 106A exceeds a second threshold (e.g., 200 points), the server application 208 can provide a second reward to the user (e.g., a $20 gift card).

As discussed above, the resource library 1102 comprises a set of coupons 1112. Each of the coupons 1112 entitles the holder to something, such as a discount or gift. For example, one of the coupons 1112 can entitle a holder to receive $5 off the purchase price of a particular item. If the message comprises a request to access one of the coupons 1112 ("YES" of 1320), the server application 208 sends coupon data to the client device 104A (1322). The coupon data represents the coupon.

In some embodiments, applications are installed on mobile devices used by the users 106. When one of the users 106 wants to use one of his or her coupons when purchasing a product, the user launches the application and uses the application to retrieve the coupon. After the application retrieves the coupon, the application displays the coupon. In some instances, a sales clerk can scan the coupon displayed by the application to redeem the coupon. In other instances, the application can print the coupon.

As discussed above, the resource library 1102 comprises a set of coupon redemption resources 1114. Each of the coupon redemption resources 1114 corresponds to a different one of the coupons 1112. If the message comprises a request to access one of the coupon redemption resources 1114 ("YES" of 1324), the server application 208 performs a coupon redemption process specified by the coupon redemption resource (1326). Various coupon redemption resources can specify various coupon redemption processes. For example, some coupon redemption resources specify coupon redemption processes that involve updating the profile 1108 of the user 106A to indicate that the user 106A has redeemed one of the coupons 1112. In another example, some coupon redemption resources can specify coupon redemption processes that increase the point total of the user 106A. In this example, some such coupon redemption processes can selectively increase the point total of the user 106A depending on whether the user 106A redeemed the coupon before certain events occur. Such events can include calendar dates, number of days, redemption by other users of the coupon, and so on.

In some embodiments, the server application 208 receives messages that comprise requests to access the coupon redemption resources 1114 from mobile devices. For example, an application can be installed on a mobile device. In this example, one of the users 106 can present one of the coupons 1112 to a clerk when the user wants to purchase a product associated with the coupon. In this example, the clerk launches the application and uses the application to capture a photograph of the coupon. The application then sends a request to access the coupon redemption resource associated with the coupon.

When the server application 208 establishes the profiles 1008 for the users 106, the server application 208 establishes personal coupon books for the users 106. A user's personal coupon book lists coupons that the user has earned by playing the games 1104. If the message comprises a request to view a personal coupon book ("YES" of 1328), the server application 208 sends coupon book data to the client device 104A (1330). The coupon book data contains data indicating coupons in the personal coupon book of the user 106A. For example, the coupon book data can comprise HTML data for a webpage that lists coupons that the user 106A has earned by playing the games 1104.

In some embodiments, coupons in the personal coupon books are organized by category. For example, the personal coupon books can contain a first section, a second section, and a third section. In this example, the first section lists coupons for groceries, the second section lists coupons for electronics, and the third section lists coupons for appliances. In this way, the users 106 can efficiently review the coupons they have earned by playing the games 1104.

Figure 14:
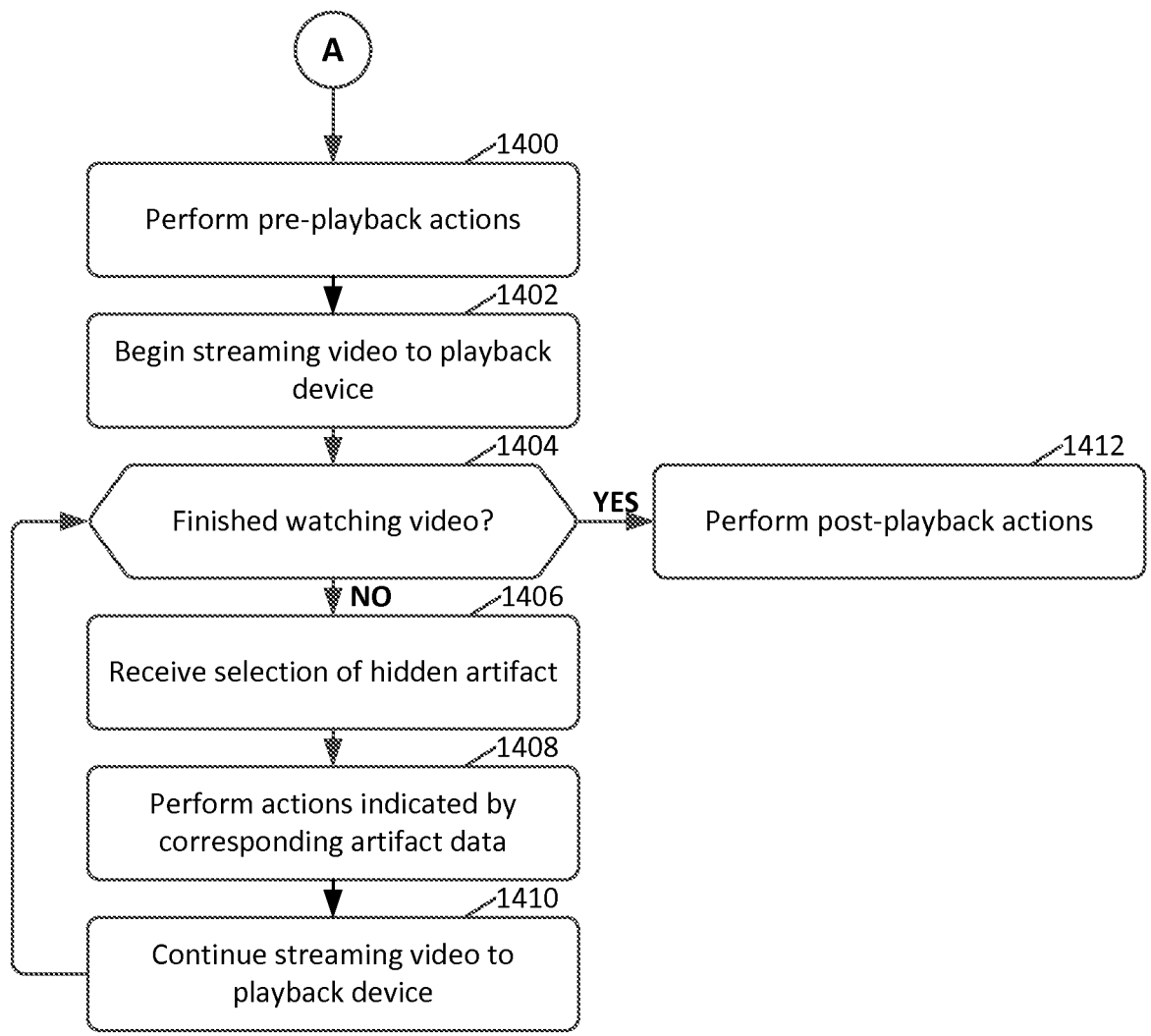
FIG. 14 is a continuation of the example operation illustrated in FIG. 13.

If the message comprises a request to access one of the videos 1120 ("YES" of 1332), the server application 208 performs a portion of the operation 1300 illustrated in FIG. 14. In other embodiments, the server application 208 does not receive request to access the videos 1120. For example, if the distribution entity 110 distributes the games 1104 in computer-readable storage media, it may be unnecessary for the client devices 104 to send requests to the server application 208 to access the videos 1120.

FIG. 14 is a flowchart illustrating a continuation of the operation 1300. As illustrated in the example of FIG. 13, the server application 208 determines whether the message comprises a request to access a given one of the videos 1120 associated with a given one of the games (1332). For ease of explanation, the following discussion assumes that the message comprises a request to access a given one of the videos 1120A of the game 1104A.

In various embodiments, the server application 208 can receive the request to access the given video in various ways. For example, the profile pages 1110 can include links the videos associated with one or more games. In this example, the server application 208 receives the request to access the given video when the users 106 select one of these links. In another example, the server application 208 presents a webpage associated with the game 1104A to the user 106A. In this example, the webpage of the game 1104A includes links to the videos 1120A associated with the game 1104A. In this example, the server application 208 receives the request to access the given video when the user 106A select one of these links.

As briefly described above, the control resources 1124A specify pre-playback operations. The server application 208 performs the specified pre-playback actions before the server application 208 begins streaming the videos 1120A to the client device 104A. After receiving the request to access the given video, the server application 208 performs the pre-playback operation specified by the control resources 1124A of the game 1104A (1400).

Various control resources can specify various pre-playback operations. For example, the pre-playback operation specified by the control resources 1124A of the game 1104A can store data to the profile 1108 of the user 106A indicating that the user 106A has watched at least some of the given video. In this way, the server application 208 can build up data regarding what types of videos the user 106A likes to watch, what types of games, and or what types of prizes interest the user 106A. In this way, the server application 208 can track the viewing habits of the user 106A.

In another example, in another example the pre-playback operation can present game instructions to the user 106A.

For instance, if the game 1104A is a tournament style game, the pre-playback operation can describe how to advance to later rounds.

In yet another example, the pre-playback operation presents a list of hidden artifacts to the user 106A. This list of hidden artifacts contains images of artifacts hidden in the given video. The server application 208 does not indicate to the user 106A where the hidden artifacts are located within the given video.

In various embodiments, the server application 208 presents the list of hidden artifacts to the user 106A in various ways. For example, the server application 208 can present the list of hidden artifacts to the user 106A in a popup window that appears on a display screen of the client device 104A.

Figure 15:
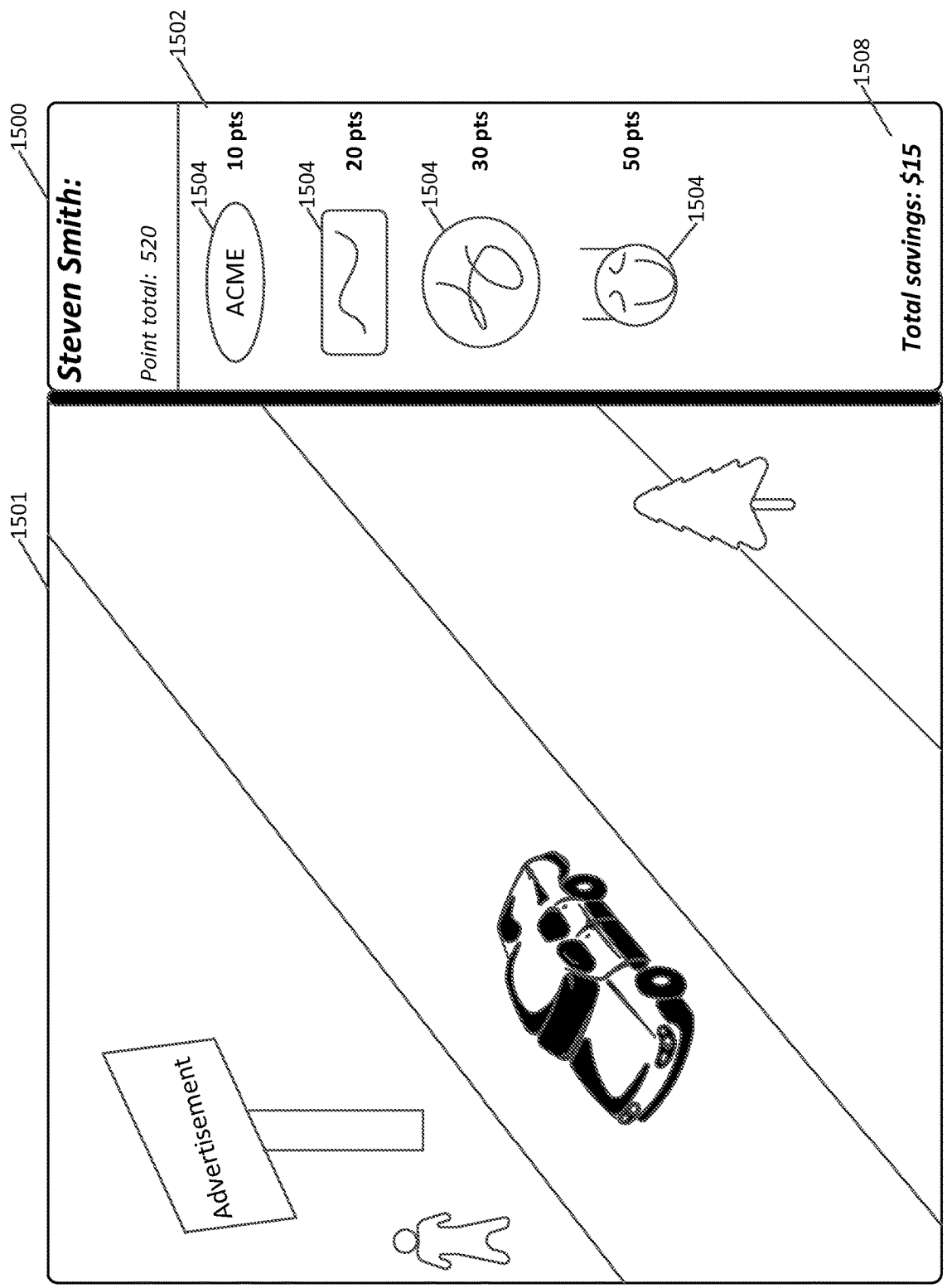
FIG. 15 is a screen illustration of an example playback interface.

FIG. 15 illustrates an example playback interface 1500. The playback interface 1500 contains a video pane 1501 and a hidden artifact pane 1502 and a video pane 1501. The video pane 1501 displays a video. The hidden artifact pane 1502 contains a list of hidden artifacts 1504. As illustrated in the example of FIG. 15, the hidden artifact pane 1502 also specifies how many points the given user can earn by finding the hidden artifacts 1504.

In some embodiments, the appearances of the hidden artifacts 1504 change after the hidden artifacts 1504 have appeared in the videos 1120 without being selected. For example, the hidden artifacts 1504 can disappear or change color after the hidden artifacts have appeared in the videos 1120 without being selected. In this way, the users 106 can know to stop looking for the hidden artifacts 1504.

The control resources 1124 of different games can specify different pre-playback operations. For example, the control resources 1124A can specify a pre-playback operation that presents the rules of a tournament style game and the control resources 1124N can specify a pre-playback operation that presents the rules of a race-to-the-finish style game.

Continuing reference is now made to the example of FIG. 14. After the server application 208 performs the pre-playback actions, the server application 208 begins streaming the given video to the client device 104A (1402). In various embodiments, the client device 104A can present the given video in various ways. For instance, in the example of FIG. 15, the playback interface 1500 contains a video pane 1501 that presents the given video. Thus, in the example of FIG. 15, the user 106A is able to see the given video and the hidden artifact pane 1502 simultaneously. In other embodiments, the client device 104A presents the given video in other windows or interfaces.

After the server application 208 begins streaming the given video to the client device 104A, the server application 208 determines whether the user 106A has finished watching the given video (1404). In various embodiments, the server application 208 can determine whether the user 106A has finished watching the given video in various ways. For example, the server application 208 can determine that the user 106A has finished watching the given video when the server application 208 receives an indication from the client device 104A that the client device 104A has displayed a last frame of the given video. In another example, the server application 208 can determine that the user 106A has finished watching the given video when the server application 208 receives an indication from the client device 104A that the client device 104A has received input from the user 106A to stop playback of the given video.

If the user 106A has not yet finished watching the given video ("NO" of 1404), the server application 208 can receive a selection of a hidden artifact in the given video (1406). In response to receiving the selection of the hidden artifact, the server application 208 performs a discovery operation of a corresponding discovery resource (1408). The corresponding discovery resources is the one of the discovery resources 1122A that corresponds to the hidden artifact.

Various ones of the discovery resources 1122 have various discovery operations. For example, a discovery operation can add the given number of points to the point total of the user 106A. In this example, the discovery operations of discovery resources corresponding to different hidden artifacts can add different numbers of points the point total of the user 106A. For instance, the discovery operation can add twenty points to the user's point total when the user 106A finds a first hidden artifact and can add fifty points to the user's point total when the user 106A finds a second hidden artifact.

In another example, a discovery operation can update the hidden artifact pane 1502 (FIG. 15). In this example, the discovery operation can update the hidden artifact pane 1502 in various ways. For example, the discovery operation can update the hidden artifact pane 1502 to remove the selected hidden artifact from the hidden artifact pane 1502. In another example, the discovery operation can update the hidden artifact pane 1502 to indicate that the selected hidden artifact has already been found.

In yet another example, a discovery operation enables the user 106A to access one of the coupons 1112. For instance, the coupons 1112 can include a $5 coupon for a given product. The user 106A earns a right to use this coupon by finding the hidden artifact.

In yet another example, the discovery operation can update the hidden artifact pane 1502 to include a link to a given one of the coupons 1112. In this example, the user 106A can click on this link to download the given coupon. The discovery operation also updates the profile 1008 of the user 106A to indicate that the user 106A has earned the given coupon. Furthermore, in this example, the discovery operation can update a savings feature 1508 in the playback interface 1500. The savings feature 1508 indicates a total value of the coupons earned by the user 106A by playing the game 1104A. For example, if the user 106A finds a first hidden artifact and earns a coupon worth $5 and then finds a second hidden artifact and earns a coupon with $10, the savings feature 1508 indicates a total value of $15.

In yet another example, the game 1104A can, in addition to finding hidden artifacts in the videos 1120A, involve finding physical objects hidden in the real world. For example, the game 1104A may be part of an advertising campaign for a coffee house chain. In this example, physical objects are hidden in particular locations of the coffee house chain. The physical objects can have computer-readable indicia, such as bar codes or two-dimensional matrix bar codes. The users 106 can take photographs of the computer-readable indicia on the physical objects with cameras on their mobile devices. When the users 106 upload the photographs to the server application 208, the server application 208 performs the discovery operation of the discovery resource that corresponds to the physical object. For example, the server application 208 can increase a point total of the user 106A.

Many other discovery operations are possible. For example, a discovery operation can present a hint or clue to the user 106A when the user 106A selects a particular combination of one or more of the hidden artifacts. The hint or clue provides some information about the location of one or more other hidden artifacts in the videos 1120. In another example, the discovery operation can update the profile 1008 of the user 106A to indicate that the user 106A found the hidden artifact. In yet another example, a discovery operation enters the user 106A in a drawing or raffle when the user 106A finds the hidden artifact.

After performing the discovery operation of the discovery resource corresponding to the selected hidden artifact, the server application 208 continues streaming the given video to the client device 104A (1410). Subsequently, the server application 208 can determine again whether the user 106A has finished watching the given video (1404).

If the user 106A has finished watching the given video ("YES" of 1404), the server application 208 performs a post-playback operation of the control resources 1124A of the game 1104A (1406).

The control resources 1124 for different games can specify different post-playback operations. For example, the given game can have the race-to-the-finish format. As mentioned above, users win games having the race-to-the-finish format by finding hidden artifacts in the videos 1120 of the games before other users do. In this example, the post-playback operation determines whether the user 106A has found all the hidden artifacts before any other user. If the user 106A has found all the hidden artifacts before any other user, the post-playback operation provides some resource to the user 106A. For example, the post-playback operation can enter the user 106A in a drawing for a prize.

In another example, the game 1104A can have the tournament format. As mentioned above, tournament games have multiple rounds. Users advance to later rounds by finding hidden artifacts in the videos 1120. Users who are unable to find the hidden artifacts are unable to advance to later rounds. In this example, the post-playback operation can present a user interface indicating whether the user 106A is allowed to access a next round of the game 1104A and update the profile 1008 for the user 106A accordingly.

In yet another example, the user 106A accrues points by finding hidden artifacts in the videos 1120A of the game 1104A. In this example, the post-playback operation determines how many points the user 106A accrued during the game 1104A. If the post-playback operation determines that the total points of the user 106A exceeds one or more thresholds, the post-playback can provide various rewards to the user 106A. For example, if the point total of the user 106A exceeds a first threshold (e.g., fifty points), the post-playback operation updates the profile 1008 of the user 106A to indicate that the user 106A has earned a coupon worth $10. In this example, if the point total of the user 106A exceeds a second threshold (e.g., seventy points), the post-playback operation updates the profile 1008 of the user 106A to indicate that the user 106A has earned a coupon worth $20.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system for providing video comprising a server, wherein the server:
   receives a video comprised of at least one hidden artifact embedded in the video's data;
   initiates playback of the video, wherein the at least one hidden artifact is shown at a predetermined time for a limited duration during playback;
   receives a selection from a user during playback of the video data, the selection indicating a location in the video that corresponds to the at least one hidden artifact, wherein the selection indicates a location in a predetermined region of a video frame in proximity to the at least one hidden artifact, wherein the selection verifies user's attention of the user throughout video playback based on the receipt of the selection from the user attempting to determine the at least one hidden artifact's location in one or more target frames in the video;
   awards the user a value when the user selects the at least one hidden artifact during playback of the video, wherein the user must be awarded a predetermined total value to gain access to a target resource; and
   sends the user a notification based on the verification of the user's attention, wherein the notification comprises a message providing access to the target resource, wherein the location of the at least one hidden artifact is changed spatially or temporally on subsequent playback of the video data.

2. The system of claim 1, wherein the target resource is access to a prize.

3. The system of claim 1, wherein the server further presents a notification to the user to encourage the user to look for the at least one hidden artifact while viewing playback of the video, the notification including a visual depiction of the at least one hidden artifact.

4. The system of claim 1, wherein the video data is further comprised of one or more embedded advertisements.

5. The system of claim 1, wherein the server further stores the values awarded to the user to a user profile associated with the user.

6. A method for providing video comprising:
   receiving a video comprised of at least one hidden artifact embedded in the video's data;
   initiating playback of the video, wherein the at least one hidden artifact is shown at a predetermined time for a limited duration during playback;
   receiving a selection from a user during playback of the video data, the selection indicating a location in the video that corresponds to the at least one hidden artifact, wherein the selection indicates a location in a predetermined region of a video frame in proximity to the at least one hidden artifact, wherein the selection verifies user's attention of the user throughout video playback based on the receipt of the selection from the user attempting to determine the at least one hidden artifact's location in one or more target frames in the video;
   awarding the user a value when the user selects the at least one hidden artifact during playback of the video, wherein the user must be awarded a predetermined total value to gain access to a target resource; and
   sending the user a notification based on the verification of the user's attention, wherein the notification comprises a message providing access to the target resource, wherein the location of the at least one hidden artifact is changed spatially or temporally on subsequent playback of the video data.

7. The method of claim 6, wherein the target resource is access to a prize.

8. The method of claim 6, further comprising presenting a notification to the user to encourage the user to look for the at least one hidden artifact while viewing playback of the video, the notification including a visual depiction of the at least one hidden artifact.

9. The method of claim 6, wherein the video data is further comprised of one or more embedded advertisements.

10. The method of claim 6, further comprising storing the values awarded to the user to a user profile associated with the user.

\* \* \* \* \*